(12) United States Patent
Kameoka et al.

(10) Patent No.: US 9,128,819 B2
(45) Date of Patent: Sep. 8, 2015

(54) STORAGE SYSTEM AND MANAGEMENT METHOD THEREFOR

(75) Inventors: Shun Kameoka, Odawara (JP); Toshimichi Kishimoto, Hadano (JP); Shinichiro Kanno, Odawara (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/375,322

(22) PCT Filed: Nov. 18, 2011

(86) PCT No.: PCT/JP2011/006423
§ 371 (c)(1),
(2), (4) Date: Nov. 30, 2011

(87) PCT Pub. No.: WO2013/072968
PCT Pub. Date: May 23, 2013

(65) Prior Publication Data
US 2014/0244958 A1    Aug. 28, 2014

(51) Int. Cl.
*G06F 12/00* (2006.01)
*G06F 12/02* (2006.01)
*G06F 3/06* (2006.01)

(52) U.S. Cl.
CPC .......... *G06F 12/023* (2013.01); *G06F 3/0605* (2013.01); *G06F 3/0613* (2013.01); *G06F 3/0647* (2013.01); *G06F 3/0685* (2013.01)

(58) Field of Classification Search
CPC ...... G06F 3/0665; G06F 3/0689; G06F 12/00
See application file for complete search history.

(56) References Cited

U.S. PATENT DOCUMENTS

| 2009/0113153 | A1* | 4/2009 | Yamamoto et al. | 711/162 |
|---|---|---|---|---|
| 2010/0082896 | A1 | 4/2010 | Orikasa et al. | |
| 2010/0115222 | A1* | 5/2010 | Usami | 711/170 |
| 2010/0235597 | A1* | 9/2010 | Arakawa | 711/163 |
| 2011/0246739 | A1 | 10/2011 | Matsuda et al. | |
| 2011/0264855 | A1* | 10/2011 | Kasako | 711/114 |

FOREIGN PATENT DOCUMENTS

JP    2010-086394    4/2010

OTHER PUBLICATIONS

PCT International Search Report and Written Opinion Issued in PCT/JP2011/006423, mail date May 3, 2012, 9 pages.

* cited by examiner

*Primary Examiner* — Shawn X Gu
(74) *Attorney, Agent, or Firm* — Foley & Lardner LLP

(57) ABSTRACT

A storage system comprises multiple first storage apparatuses, and a controller which provides a first logical volume corresponding to a storage area of the multiple first storage apparatuses to a host computer. The controller partitions a storage area corresponding to the first logical volume into multiple first physical storage areas, manages the partitioned multiple first physical storage areas as physical storage areas of a storage pool, creates a first virtual volume which is provided to the host computer, and associates, from among the multiple first physical storage areas, a physical storage area in which user data is stored, with the first virtual volume.

14 Claims, 34 Drawing Sheets

Fig. 7

TPVOL configuration table 601

| Index | TPVOL ID | Number of VPs | Number of UVPs | Number of URPs | | |
|---|---|---|---|---|---|---|
| | | | | Pool VOL #1 | Pool VOL #2 | Pool VOL #3 |
| 0 | 100 | 6 | 5 | 4 | 1 | 0 |
| 1 | 101 | 4 | 3 | 1 | 0 | 2 |

VP configuration table 603

| TPVOL ID 801 | VP ID 802 | Pool VOL ID 803 | RP ID 804 |
|---|---|---|---|
| 100 | 0 | 6 | 5 |
| 100 | 1 | 4 | 3 |
| 100 | 2 | FFFF | FFFF |
| 100 | 3 | 2 | 0 |
| 100 | 4 | 1 | 2 |
| 100 | 5 | 1 | 4 |
| 101 | 1 | 3 | 3 |
| 102 | 2 | FFFF | FFFF |
| 103 | 3 | 3 | 0 |
| 104 | | | |

Pool VOL configuration table 605

| Pool VOL ID 901 | Start page ID 902 | End page ID 903 | Total number of pages 904 | Number of URPs 905 | PDEV type 906 | Tier ranking 907 |
|---|---|---|---|---|---|---|
| 0 | 0 | 5 | 6 | 5 | SSD | 0 |
| 1 | 6 | 9 | 4 | 1 | SAS | 1 |
| 2 | 10 | 14 | 5 | 2 | SATA | 2 |

Fig. 10

RP configuration table 607

| RP ID 1001 | Pool VOL ID 1002 | RP ID in pool VOL 1003 | TPVOL ID 1004 | VP ID 1005 | IOPS 1006 |
|---|---|---|---|---|---|
| 0 | 0 | 0 | 100 | 0 | 1 |
| 1 | 0 | 1 | 100 | 1 | 2 |
| 2 | 0 | 2 | 100 | 4 | 8 |
| 3 | 0 | 3 | 101 | 0 | 7 |
| 4 | 0 | 4 | 100 | 5 | 3 |
| 5 | 0 | 5 | FFFF | FFFF | FFFF |
| 6 | 1 | 0 | 100 | 3 | 4 |
| 7 | 1 | 1 | FFFF | FFFF | FFFF |
| 8 | 1 | 2 | FFFF | FFFF | FFFF |
| 9 | 1 | 3 | FFFF | FFFF | FFFF |
| 10 | 2 | 0 | 101 | 3 | 6 |
| 11 | 2 | 1 | 101 | 1 | 5 |
| 12 | 2 | 2 | FFFF | FFFF | FFFF |
| 13 | 2 | 3 | FFFF | FFFF | FFFF |
| 14 | 2 | 4 | FFFF | FFFF | FFFF |

Fig. 11

TD configuration table 609

| TD ID 1101 | TD area ID 1102 | Volume ID 1103 | Volume area ID 1104 |
|---|---|---|---|
| 1 | 0 | 1 | 0 |
| 1 | 1 | 1 | 1 |
| 1 | 2 | 1 | 2 |
| 1 | 3 | 1 | 3 |

Fig. 21

RP configuration table 607

| RP ID 1001 | Pool VOL ID 1002 | RP ID in pool VOL 1003 | TPVOL ID 1004 | VP ID 1005 | IOPS 1006 |
|---|---|---|---|---|---|
| 0 | 0 | 0 | 100 | 0 | 1 |
| 1 | 0 | 1 | 100 | 1 | 2 |
| 2 | 0 | 2 | 100 | 4 | 8 |
| ..... | ..... | ..... | ..... | ..... | ..... |
| 15 | 3 | 0 | 102 | 0 | 0 |
| 16 | 3 | 1 | 102 | 1 | 0 |
| 17 | 3 | 2 | 102 | 2 | 0 |
| 18 | 3 | 3 | 102 | 3 | 0 |
| 19 | 3 | 4 | 102 | 4 | 0 |
| 20 | 4 | 0 | 103 | 0 | 0 |
| 21 | 4 | 1 | 103 | 1 | 0 |
| 22 | 4 | 2 | 103 | 2 | 0 |

Fig. 24A

RP configuration table 607

| RP ID 1001 | Pool VOL ID 1002 | RP ID in pool VOL 1003 | TPVOL ID 1004 | VP ID 1005 | IOPS 1006 |
|---|---|---|---|---|---|
| ... | ... | ... | ... | ... | ... |
| 15 | 3 | 0 | 102 | 0 | 0 |
| 16 | 3 | 1 | 102 | 1 | 0 |
| 17 | 3 | 2 | FFFF | FFFF | FFFF |
| 18 | 3 | 3 | FFFF | FFFF | FFFF |
| 19 | 3 | 4 | 102 | 4 | 0 |

Fig. 24B

VP configuration table 603

| TPVOL ID 801 | VP ID 802 | Pool VOL ID 803 | RP ID 804 |
|---|---|---|---|
| ... | ... | ... | ... |
| 102 | 0 | 3 | 0 |
| 102 | 1 | 3 | 1 |
| 102 | 2 | FFFF | FFFF |
| 102 | 3 | FFFF | FFFF |
| 102 | 4 | 3 | 4 |

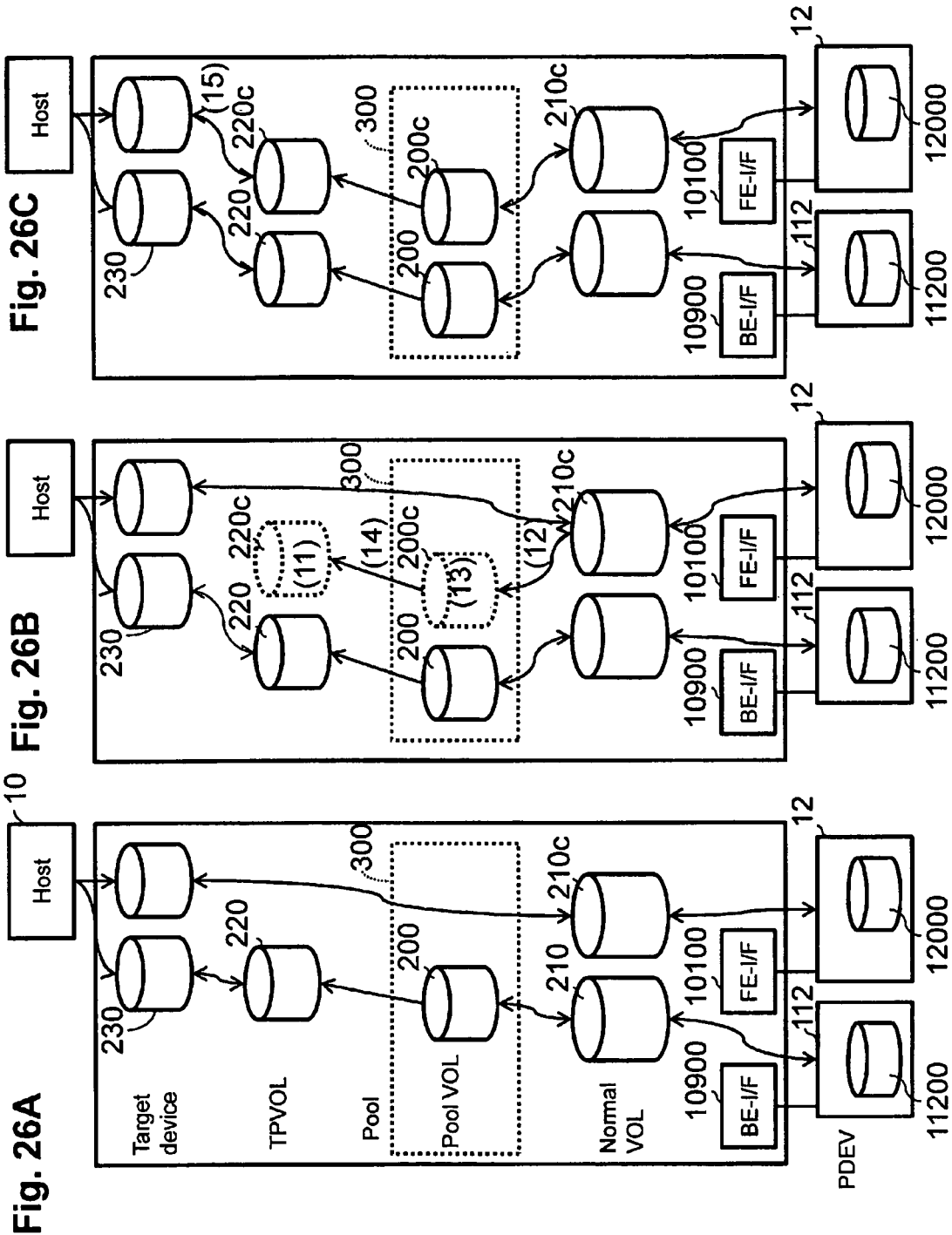

Fig. 31

RP configuration table  607

| 1001 RP ID | 1002 Pool VOL ID | 1003 RP ID in pool VOL | 1004 TPVOL ID | 1005 VP ID | 1006 IOPS |
|---|---|---|---|---|---|
| 0 | 0 | 0 | 100 | 0 | 1 |
| 1 | 0 | 1 | 100 | 1 | 2 |
| 2 | 0 | 2 | 100 | 4 | 8 |
| 3 | 0 | 3 | 101 | 0 | 7 |
| 4 | 0 | 4 | 100 | 5 | 3 |
| 5 | 0 | 5 | FFFF | FFFF | FFFF |
| 6 | 1 | 0 | 100 | 3 | 4 |
| 7 | 1 | 1 | FFFF | FFFF | FFFF |
| 8 | 1 | 2 | FFFF | FFFF | FFFF |
| 9 | 1 | 3 | FFFF | FFFF | FFFF |
| 10 | 2 | 0 | 101 | 3 | 6 |
| 11 | 2 | 1 | 101 | 1 | 5 |
| 12 | 2 | 2 | FFFF | FFFF | FFFF |
| 13 | 2 | 3 | FFFF | FFFF | FFFF |
| 14 | 2 | 4 | FFFF | FFFF | FFFF |

STORAGE SYSTEM AND MANAGEMENT METHOD THEREFOR

TECHNICAL FIELD

The present invention relates to technology for managing a storage system that provides a virtual volume.

BACKGROUND ART

A storage system provides a logical volume, which is a logical storage area, to a higher-level apparatus, such as a host computer. In addition to a normal volume to which a storage system physical storage area of the same capacity as the logical volume is allocated beforehand, the logical volume includes a Thin provisioning volume to which a physical storage area of the required capacity is dynamically allocated to the logical volume when a write has been performed. In a Thin provisioning volume, a large capacity virtual volume is provided to the host computer, and when a write request has been received from the host computer, a physical storage area inside the storage system is allocated only to the area corresponding to the write. Therefore, compared to the normal volume, the Thin provisioning volume makes it possible to reduce the physical storage area used by the storage system, and, in turn, to greatly reduce costs.

Patent Literature 1 discloses technology for migrating normal volume data to a Thin provisioning volume. In accordance with this, the storage system exercises control such that a physical storage area inside the storage system is allocated once to the entire area of the migration-destination Thin provisioning volume, and thereafter, a physical storage area inside the storage system is allocated only to the area in which the user data is stored, thereby reducing physical storage area consumption and enabling the effective use of the physical storage area.

CITATION LIST

Patent Literature

PTL 1: Japanese Patent Application Laid-open No. 2010-86394

SUMMARY OF INVENTION

Technical Problem

In Patent Literature 1, migrating data stored in the normal volume to the Thin provisioning volume makes it possible to eliminate the allocation of a physical storage area to an area in which user data is not stored. However, on the other hand, the load placed on the storage system by the migration process can lead to a drop in storage system I/O performance.

Solution to Problem

In the present invention, a storage system comprises multiple first storage devices, and a controller which provides a first logical volume corresponding to the storage area of the multiple first storage devices to a host computer. The controller partitions the storage area corresponding to the first logical volume into multiple first physical storage areas, manages the partitioned multiple first physical storage areas as physical storage areas of a storage pool, creates a first virtual volume, which is provided to the host computer, and associates, from among the multiple first physical storage areas, a physical storage area in which user data is stored, with the first virtual volume.

BRIEF DESCRIPTION OF DRAWINGS

FIG. 7 shows the configuration of a TPVOL configuration table 601.
FIG. 8 shows the configuration of a VP configuration table 603.
FIG. 10 shows the configuration of a RP configuration table 607.
FIG. 11 shows the configuration of a TD configuration table 609.
FIG. 21 shows an example of the updating of the RP configuration table.
FIG. 24A is diagram for illustrating a registration to the pool VOL configuration table with respect to the variation.
FIG. 24B is diagram for illustrating a registration to a TP address table with respect to the variation.
FIG. 26A shows an example of the state prior to the conversion from a target externally-coupled VOL to a TPVOL.
FIG. 26B shows a portion of the conversion process from the target externally-coupled VOL to the TPVOL.
FIG. 26C shows the remainder of the conversion process from the target externally-coupled VOL to the TPVOL.

FIG. 31 is a diagram for illustrating a reallocation function.

DESCRIPTION OF EMBODIMENTS

Figure 1:
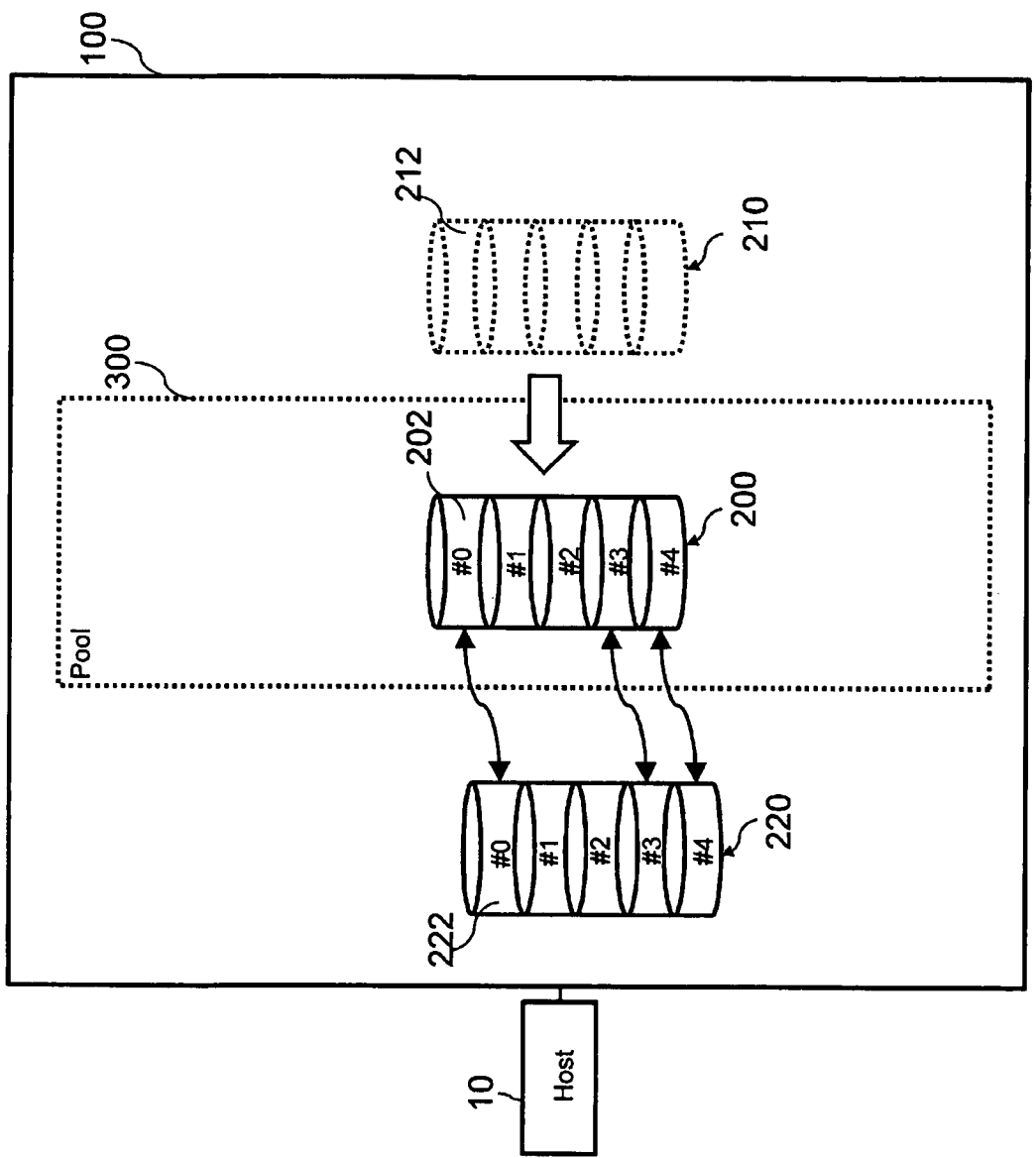
FIG. 1 shows an overview of Example 1.

A number of examples of the present invention will be explained below.

Furthermore, in the following explanation, various types of information may be explained using the expression "xxx table", but the various information may also be expressed using a data structure other than a table. To show that the various information is not dependent on the data structure, "xxx table" can be called "xxx information".

Also, in the following explanation, there may be cases where processing is explained having a "program" as the doer of the action, but since the stipulated processing is performed in accordance with a program being executed by a processor (for example, a CPU (Central Processing Unit)) while using a storage resource (for example, a memory) and/or a communication interface device (for example, a communication port) as needed, the processor may also be regarded as the doer of the processing. A process, which is explained using the program as the doer of the action, may be regarded as a process performed by the storage system, a controller of the storage system, a below-described MP-PK of the controller, or an MP (microprocessor) inside the MP-PK. Furthermore, the processor may comprise a hardware circuit that carries out either part or all of the processing performed by the processor. A computer program may be installed in respective computers from a program source. The program source, for example, may be either a program delivery server or a storage medium.

Also, in the following explanation, a logical volume may be abbreviated as "VOL".

Furthermore, in the following explanation, a virtual VOL that conforms to Thin Provisioning may be abbreviated as "TPVOL". The TPVOL comprises multiple virtual pages. The virtual page is a virtual storage area. A real page is allocated to a write-destination virtual page in accordance with a write command from a host. A pool, for example, comprises multiple pool VOLs, and each pool VOL is partitioned into two or more real pages. The pool VOL is a normal VOL that is a member of the pool.

"Normal VOL" refers to a type of VOL other than the TPVOL. Typically, a normal VOL is either an internal VOL or an externally-coupled VOL.

The "internal VOL" is a VOL based on a RAID group of the storage system. The RAID group comprises two or more PDEV, and stores data at a prescribed RAID level.

A "PDEV" is a physical storage device. The storage system may comprise at least one of a memory drive (for example, a SSD (Solid State Drive)), which comprises a nonvolatile semiconductor memory (for example, a flash memory), a HDD (Hard Disk Drive), or another type of drive as the PDEV. At least one type of drive of the memory drive, HDD, and other type of drive (for example, a DVD (Digital Versatile Disk) drive) may be multiple drives with different types of interfaces. The types of interfaces may include at least one of a FC (Fibre Channel), SAS (Serial Attached SCSI), and SATA (Serial ATA).

The "externally-coupled VOL" is a virtual VOL mapped to an external VOL.

An "external VOL" is a VOL of a storage system external to the storage system. This VOL may be a TPVOL or a normal VOL.

Also, in the following explanation, when giving an explanation that distinguishes between multiple units of the same element, an identification number for this element may be used instead of the element's reference sign.

Example 1

FIG. 1 shows an overview of Example 1.

A host apparatus (hereinafter, host) 10 is coupled to a storage system 100. There may be one or multiple hosts 10. The storage system 100 comprises a pool 300, which is partitioned into multiple real pages, and provides the host 10 with a TPVOL 220.

The TPVOL 220 comprises multiple virtual pages 222. The TPVOL 220 is recognized by the host 10 as a logical volume. The host 10 sends an I/O request (a write request or a read request) that specifies the TPVOL 220. When a real page has not been allocated to a write-destination virtual page 222 to which a write-destination address, which is specified in the write request sent from the host 10, belongs, an allocatable real page (typically, a real page that is not allocated to any virtual page) is allocated from the pool 300 by the storage system 100.

There may be a case where it is desirable to provide data in a normal VOL 210 to the host 10 as the TPVOL 220. A conceivable method for realizing this case is one that migrates data from the normal VOL 210 to the TPVOL 220, and provides the TPVOL 220, to which the data has been migrated, to the host 10. However, this method poses the following two problems.

(1) The free capacity of the pool 300 must be the same as the capacity of the normal VOL. This is because the migration of data from the start to the end of the normal VOL will be performed regardless of whether or not there is any free space in the normal VOL, and so real pages are allocated to the entire area of the TPVOL.

(2) There is a drop in performance in the I/O processing (the input/output of data to/from the logical volume) carried out by the storage system 100. This is because the migration places a load on the storage system 100.

Consequently, in this example, the data inside the normal VOL can be provided to the host 10 as the data inside the TPVOL without migrating the data from the normal VOL to the TPVOL. An overview of one method for realizing this is as follows.

(A) The normal VOL (hereinafter, the target normal VOL) 210 in which the data to be provided to the host 10 as data inside the TPVOL is incorporated into the pool 300. This normal VOL 210 may be either the internal VOL or the externally-coupled VOL described hereinabove.

(B) The target normal VOL 210 is partitioned into multiple real pages 202 either after being regarded as a pool VOL 200 (after being incorporated into the pool 300) or before being regarded as a pool VOL 200 (before being incorporated into the pool 300). Below, a pool VOL, which was a target normal VOL, will be referred to as a "target pool VOL".

(C) One TPVOL 220 corresponding to the target pool VOL 200 is created. The capacity of this TPVOL 220 is equal to or larger than the capacity of the target pool VOL 200.

(D) Only valid real pages #0, #3 and #4 of the multiple real pages comprising the target pool VOL 200 are allocated to virtual pages #0, #3 and #4 in the created TPVOL 220 corresponding to the locations of these valid real pages #0, #3 and #4. In other words, a valid real page 202 inside the target pool VOL 200 is allocated to a virtual page 222, which is in substantially the same location as the location (for example, the LBA (Logical Block Address)) of this valid real page 202. A "valid real page" is a real page in which data to be provided to the host 10 is stored.

(E) Invalid real pages #1 and #2 of the multiple real pages comprising the target pool VOL 200 are not allocated to virtual pages in the created TPVOL 220. This avoids the wasteful allocation of a real page to the TPVOL 220. Furthermore, an "invalid real page" is a real page in which data to be provided to the host 10 is not stored, for example, a real page in which only data written as a logical volume format is stored. This data includes 0 data (data in which all the bits are 0s).

(F) The TPVOL 222 to which valid real pages from inside the target pool VOL 200 have been allocated is provided to the host 10. Hereinbelow, this TPVOL will be referred to as the "target TPVOL".

This makes it possible to read data stored in the target normal VOL 210 in a case where the host 10 sends a read request specifying the target TPVOL 220.

Furthermore, the data stored in the target normal VOL 210 may be stored in a real page inside a different pool VOL from the target pool VOL 200 in accordance with a data migration inside the pool 300 (the migration of data between real pages). However, in accordance with this page migration, the migration-destination real page is allocated to the allocation-destination virtual page of the migration-source real page in place of the migration-source real page. For this reason, the host 10, upon sending a read request specifying the target TPVOL 220, is able to read the data stored in the target normal VOL 210 even though the data inside the target normal VOL has been arranged in a real page inside a pool VOL that differs from the target pool VOL.

Also, a determination as to whether the real page inside the target pool VOL is a valid real page or an invalid real page, for example, may be made in a process, which partitions the target pool VOL into multiple real pages. For example, a real page in which data other than 0 data is stored may be determined to be a valid real page.

According to the method comprising (A) through (F) above, the reading of data stored in the target normal VOL in accordance with the sending of a read request specifying the TPVOL can be realized without migrating the data from the target normal VOL to the TPVOL.

Example 1 will be explained in detail hereinbelow.

Figure 2:
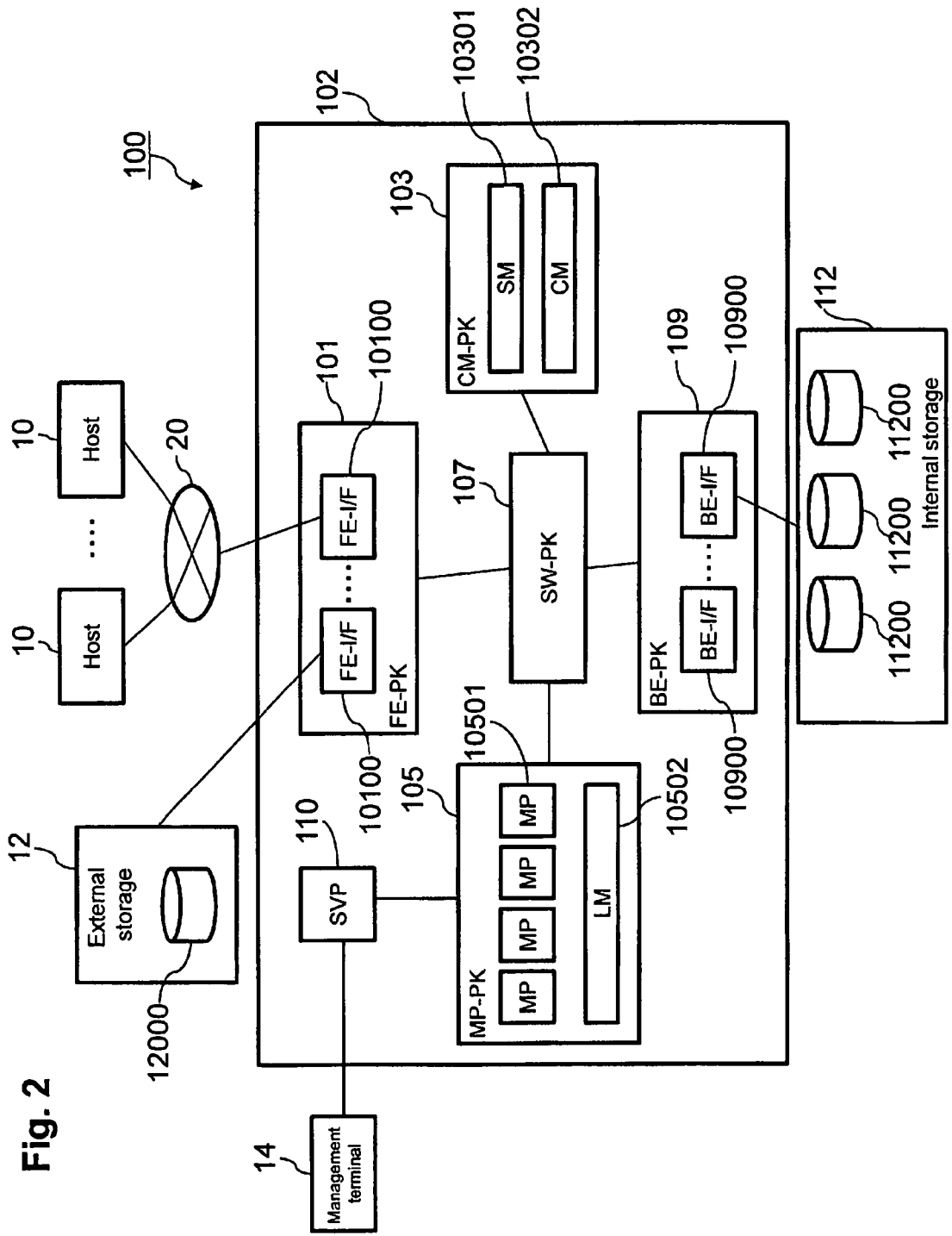
FIG. 2 shows the configuration of a storage system 100 related to Example 1.

FIG. 2 shows the configuration of a storage system 100 related to Example 1.

The storage system 100 comprises multiple (or one) PDEVs 11200, and a controller 102, which is coupled to these PDEVs 11200. These PDEVs 11200, for example, make up one or more internal storages 112. The internal storage 112 is a storage apparatus of the storage system 100. Either one or multiple hosts 10, an internal storage 112, and a management terminal 14 are coupled to the controller 102, but one or more external storages 12 may also be coupled in addition thereto.

The external storage 12 is a storage apparatus outside of the storage system 100. The external storage 12 also comprises one or more PDEVs 12000.

The one or more internal storages 112 may comprise multiple types of PDEVs 11200 featuring different I/O performance. The multiple types of PDEVs 11200 with different I/O performance, for example, may be a SSD (Solid State Drive) and a HDD (Hard Disk Drive). The HDD may be a SATA (Serial ATA) HDD and a SAS (Serial Attached SCSI) HDD.

Two or more RAID groups may be configured using the multiple PDEVs 11200. An internal VOL may be created based on a RAID group. Also, two or more RAID groups may also be configured using the multiple PDEVs 12000. An external VOL may be created based on this RAID group.

The controller 102 comprises FE-PK 101, BE-PK 109, SW-PK 107, CM-PK 103, and MP-PK 105. In the example given in the drawing, each type of package (PK) is standalone, but there may be multiple of at least one type of PK of the multiple types of PKs.

The FE-PK 101 is an apparatus comprising one or more front-end interface devices (FE-I/F hereinafter) 10100. The FE-I/F 10100 is an interface device for communicating with a communication apparatus that exists in the front end, such as the host 10 or the external storage 12. The FE-UF 10100 receives an I/O request (a write request or a read request), and transfers the received I/O request to the MP-PK 105. Furthermore, in a case where the input/output destination conforming to the I/O request is an externally-coupled VOL, the FE-I/F 10100 sends the I/O request specifying an external VOL to the external storage apparatus 12, which comprises this external VOL to which this externally-coupled VOL is mapped. In accordance with this, in a case where this I/O request is a read request, the FE-I/F 10100 receives data read from the external VOL from the external storage apparatus 12, and transfers this data to the host 10, and in a case where the I/O request is a write request, transfers the data conforming to this write request to the external storage apparatus 12.

The BE-PK 109 comprises multiple backend interface devices (hereinafter, BE-I/F) 10900. The BE-I/F 10900 is an interface device for communicating with the PDEV 11200. The BE-I/F 10900 either reads data from a PDEV 11200, which is the basis for the I/O-destination internal VOL, and transfers this data to the cache memory (hereinafter, CM) 10302 of the CM-PK 103, or writes the data from the CM-PK 103 to the PDEV 112.

The MP-PK 105 comprises multiple (or one) microprocessors (hereinafter, MP) 10501, and one or multiple local memories (hereinafter LM) 10502. The MP 10501 processes an I/O request from the FE-I/F 10100. The LM 10502 stores a required portion of management information stored in a shared memory (hereinafter, SM) 10301, and also stores a computer program to be executed by the MP 10501.

Multiple PKs, that is, the FE-PK 101, the BE-PK 109, the MP-PK 105, and the CM-PK 103 are coupled to the SW-PK 107. The SW-PK 107 comprises one or more switching devices for controlling the connections between these modules, and, for example, may be a crossbar switch.

The CM-PK 103 comprises the SM 10301 and a CM 10302. At least one of the SM and CM is a volatile and/or nonvolatile memory. The CM 10302 has a storage area for temporarily storing I/O-target data for a real page. The SM 10301 has a storage area for storing a variety of management information (information used in the operation of the storage system 100) and computer programs. The information and computer programs will be explained further below.

The controller 102 comprises a Service Processor (hereinafter, SVP) 110. The SVP 110 is a kind of computer for either maintaining or managing the storage system 100. The SVP 110 may be a management system, or a management system may be constructed using the SVP 110 and the management terminal 14. The management terminal 14, for example, is a computer comprising a display device and an input device. The management terminal 14, in accordance with operations by the administrator, sends the SVP 110 commands to perform various settings with respect to the storage system 100. In response to these commands, the SVP 110 updates management information in the SM 10301 and configures information in the SM 10301.

Figure 3:
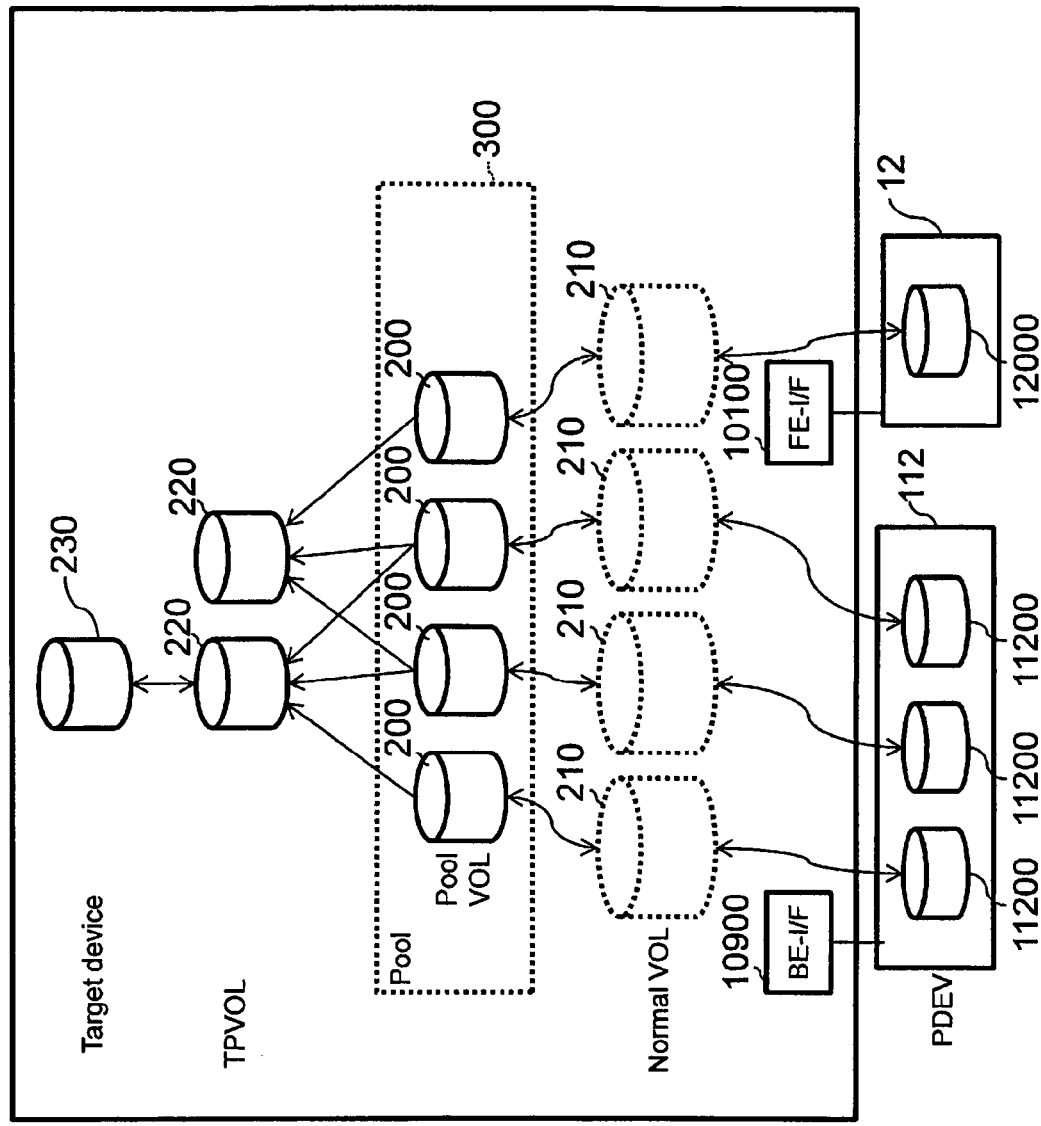
FIG. 3 shows the storage hierarchy of the storage system 100.

FIG. 3 shows the storage hierarchy of the storage system 100.

A target device 230 is associated with a logical volume (for example, a TPVOL 220) that is provided to the host 10. The logical volume may be specified in accordance with the target device 230 being specified in an I/O request from the host 10.

There is a normal VOL 210 that serves as an internal VOL and a normal VOL 210 that serves as an externally-coupled VOL. One or more normal VOLs are regarded as pool VOLs and comprise a pool 300. The I/O performance of the internal VOL 210 may be a function of the I/O performance of the PDEV 11200, which is based on this internal VOL 210. The I/O performance of the externally-coupled VOL may be a function of the I/O performance of the external VOL that is the mapping destination of this externally-coupled VOL and/or the communication status between the external storage apparatus 12 comprising the external VOL and the controller 102.

The pool 300 may comprises multiple pool VOLs 200 featuring different I/O performance. That is, the pool 300 may comprise multiple tiers. Each tier may comprise pool VOLs 200 having substantially the same I/O performance. In a pool 300 that comprises multiple tiers, a page migration may be performed on the basis of the I/O frequency of the real page (of the virtual page). Specifically, for example, in a case where a real page with a high I/O frequency is located in a low tier, the data inside this real page is migrated to a real page in a high tier. Also, for example, in a case where a real page with a low I/O frequency is located in a high tier, the data inside this real page is migrated to a real page in a low tier. The page migration may be performed on the basis of another type of I/O attribute information, for example, a last I/O time either instead of or in addition to the I/O frequency of the real page (or virtual page).

Figure 4:
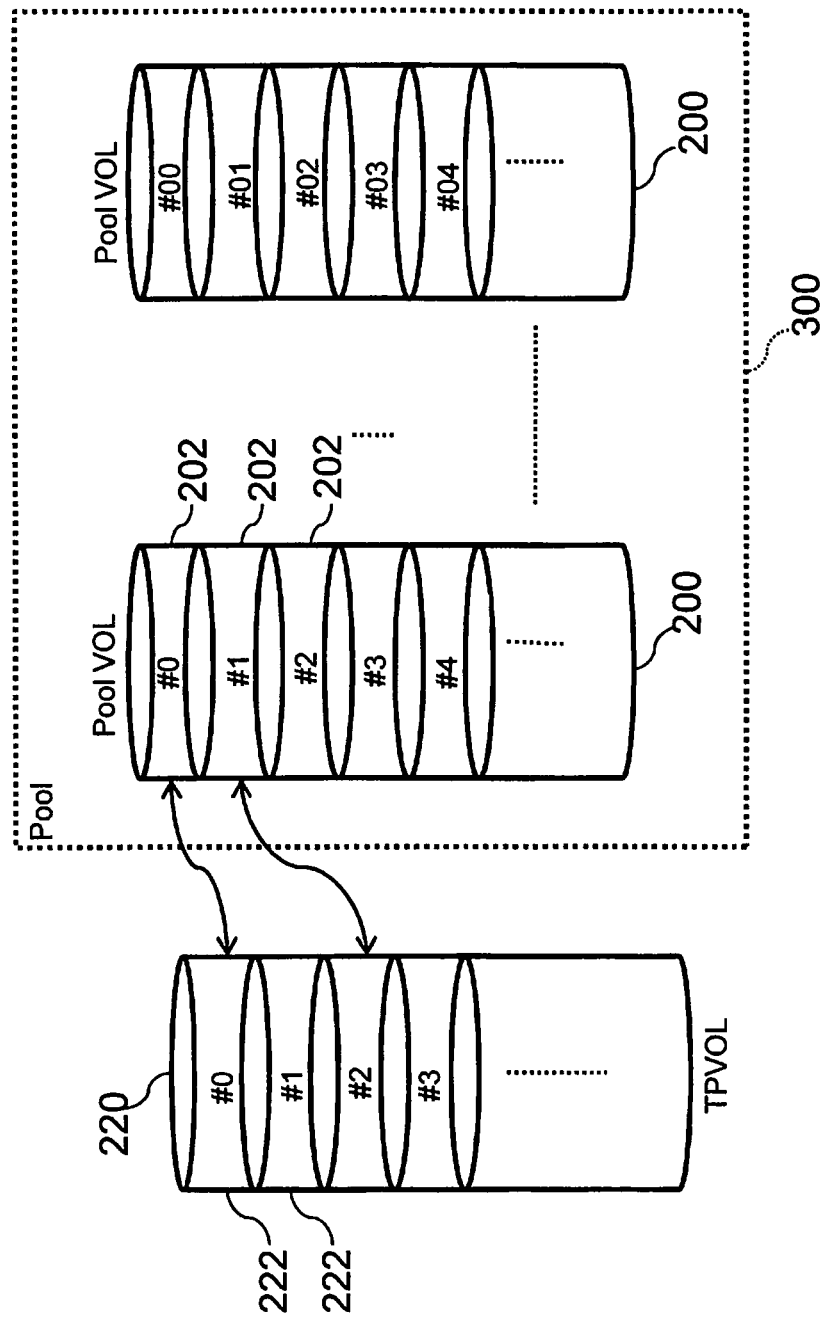
FIG. 4 shows an example of the allocation of a real page to a virtual page.
Figure 5:
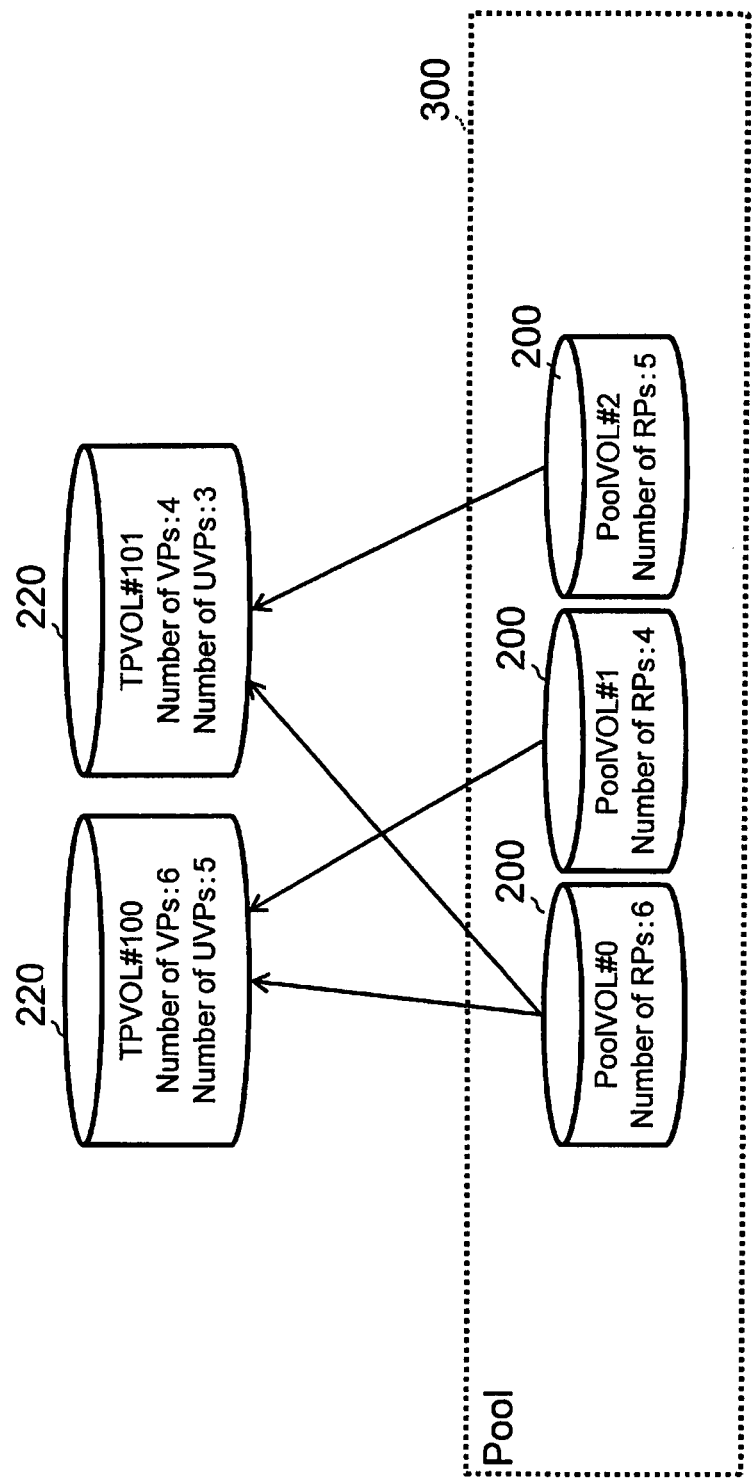
FIG. 5 shows an example of the allocation of a real page from a pool to a TPVOL.

For example, as shown in FIG. 4, a real page 202 from the pool 300 is allocated to a virtual page 222 inside a TPVOL 220. As a result, as shown in FIG. 5, for example, five virtual pages 222 of the six virtual pages 222 comprising the TPVOL #100 become virtual pages 222 to which real pages 202 have been allocated (that is, used virtual pages). Hereinbelow, for the sake of convenience, a virtual page will be abbreviated as "VP" and a real page will be abbreviated as "RP" in the drawings. A real page inside any pool VOL 200 in the pool 300 may be allocated to a virtual page inside any TPVOL 220 associated with this pool 300.

Figure 6:
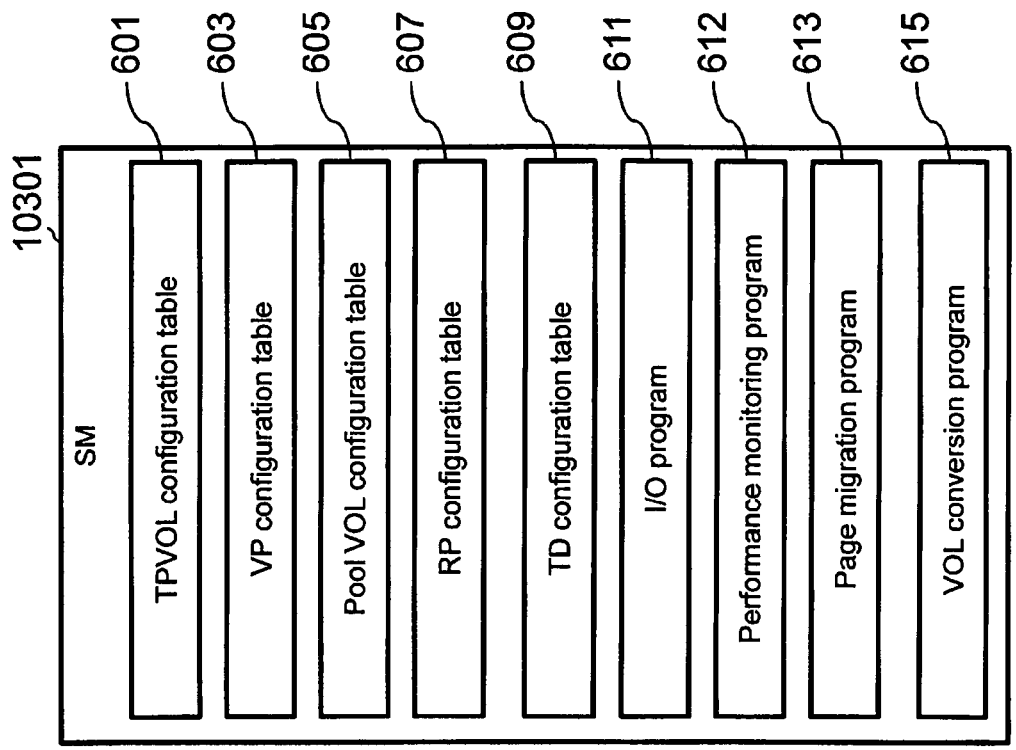
FIG. 6 shows the tables and computer programs stored in a SM10301.

FIG. 6 shows the tables and computer programs stored in the SM 10301.

The management information stored in the SM 10301 comprises various types of tables. Specifically, for example, the tables stored in the shared memory 10301 include a TPVOL configuration table 601, a VP configuration table 603, a pool VOL configuration table 605, an RP configuration table 607, and a TD configuration table 609. At least one of these tables may be created after the storage system 100 is in operation.

Also, the computer programs stored in the SM 10301, for example, include an I/O program 611, a performance monitoring program 612, a page migration program 613, and a VOL conversion program 615. The I/O program 611 processes an I/O request from the host 10. The performance monitoring program 612 monitors the I/O frequency of a real page (or a virtual page). The page migration program 613 performs a page migration. The VOL conversion program 615 converts a target normal VOL into a target TPVOL, and provides the target TPVOL to the host 10.

FIG. 7 shows the configuration of the TPVOL configuration table 601.

The TPVOL configuration table 601 shows the number of real pages 202 that have been allocated to a TPVOL 220, and a breakdown thereof. Specifically, for example, this table 601 comprises the following information for each TPVOL 220:
(*) an index 701 assigned to a TPVOL 220;
(*) a TPVOL ID 702 denoting the identification number of the TPVOL 220;
(*) a number of VPs 703 denoting the total number of virtual pages 222 comprising the TPVOL 220;
(*) a number of UVPs 704 denoting the number of used virtual pages 222 of the total number of virtual pages inside the TPVOL 220; and
(*) a number of URPs 705 denoting how many real pages 202 are allocated to which pool VOLs 200.

According to the example in this drawing, the situation is as follows:
(*) the TPVOL #100 comprises six virtual pages;
(*) five of these six virtual pages are used virtual pages; and
(*) of these five used virtual pages, four real pages are being allocated from pool VOL #1, one real page is being allocated from pool VOL #2, and no real pages are being allocated from pool VOL #3.

FIG. 8 shows the configuration of the VP configuration table 603.

The VP configuration table 603 shows the corresponding relationship between a virtual page 222 and a real page 202. Specifically, for example, this table 603 comprises the following information for each virtual page:
(*) a TPVOL ID 801 denoting the ID (for example, the identification number) of the TPVOL comprising a virtual page 222;
(*) a VP ID 802 denoting the ID of the virtual page 222 in the TPVOL 220;
(*) a pool VOL ID 803 denoting the ID of the pool VOL 200 comprising the real page 202 allocated to the virtual page 222; and
(*) a RP ID 804 denoting the ID of the real page 202, which is allocated to the virtual page 222, in the pool VOL.

For example, "FFFF" is used as the value of the pool VOL ID 803 and the RP ID 804 corresponding to a virtual page 222 to which a real page 202 has not been allocated. According to the example in this drawing, real page #5 of pool VOL #6 is allocated to virtual page #0 of TPVOL #100. Also, according to the example in this drawing, a real page 202 has yet to be allocated to virtual page #2 of TPVOL #100.

Figure 9:
FIG. 9 shows the configuration of a pool VOL configuration table 605.

FIG. 9 shows the configuration of the pool VOL configuration table 605.

The pool VOL configuration table 605 shows information related to the configuration of a pool VOL 200. Specifically, for example, this table 605 comprises the following information for each pool VOL 200:
(*) a pool VOL ID 901 denoting the ID of a pool VOL;

(*) a start page ID 902 denoting the ID of the real page at the head of the pool VOL;

(*) an end page ID 903 denoting the ID of the real page at the end of the pool VOL;

(*) a number of total pages 904 denoting the total number of real pages in the pool VOL;

(*) a number of URPs 905 denoting the number of real pages (used real pages) in the pool VOL already allocated to virtual pages;

(*) a PDEV type 906 denoting the type of PDEV constituting the basis of the pool VOL; and (*) a tier ranking 907 denoting the ranking of the tier to which the pool VOL belongs.

According to the example in this drawing, pool VOL #0 comprises six real pages 202 of real pages #0 through #5, and five of these six real pages 202 are used real pages. Also, according to the drawing, the pool VOL #0 is a VOL based on a SSD, and belongs to the tier ranking 0 (the tier featuring the highest I/O performance).

FIG. 10 shows the configuration of the RP configuration table 607.

The RP configuration table 607 shows information related to the real page. Specifically, for example, this table 607 comprises the following information for each real page:

(*) a RP ID 1001 denoting the ID of the real page uniquely identified inside the storage system 100;

(*) a pool VOL ID 1002 denoting the ID of the pool VOL 200 comprising this real page;

(*) a RP ID in pool VOL 1003 denoting the ID of the real page uniquely identified inside the pool VOL 200;

(*) a VOL ID 1004 denoting the ID of the TPVOL 220 comprising the virtual page 222 that is the allocation destination of the real page;

(*) a VP ID 1005 denoting the ID of the virtual page 222 that is the migration destination of the real page; and (*) a IOPS (IOs] per second) 1006 denoting the total number of reads and/or writes per unit of time for a real page (or an allocation-destination virtual page).

According to the example in the drawing, real page #0 is in pool VOL #0, is allocated to virtual page #0 of TPVOL #100, and has either a read or a write performed once per unit of time (for example, per second). Also, real page #8 is associated with real page #2 of pool VOL #1. Real page #8 has not been allocated to a virtual page 222. For this reason, the values of the TPVOL ID 1004, the VP ID 1005 and the IOPS 1006 are all "FFFF".

FIG. 11 shows the configuration of the TD configuration table 609.

The TD configuration table 609 shows the corresponding relationship between a target device 230 area and a logical volume area. Specifically, for example, this table 609 comprises the following information for each target device 230 area (hereinafter, TD area):

(*) a target device ID 1101 denoting the ID of the target device 230 comprising the TD area;

(*) a target device area ID 1102 denoting the ID of the TD area;

(*) a data storage-destination volume ID 1103 denoting the identification number of the logical volume to which an area corresponding to the TD area belongs; and (*) a data storage-destination volume ID 1104 denoting the identification number of the logical volume that constitutes the storage destination of the data in the TD area.

According to the example in this drawing, data, which is in area #0 of target device #1, is stored in area #0 of volume #1. The volume referred to here may include a TPVOL, a pool VOL, a normal VOL (including an internal VOL and an externally-coupled VOL), and an external VOL.

The processing performed by this example will be explained below.

Figure 12:
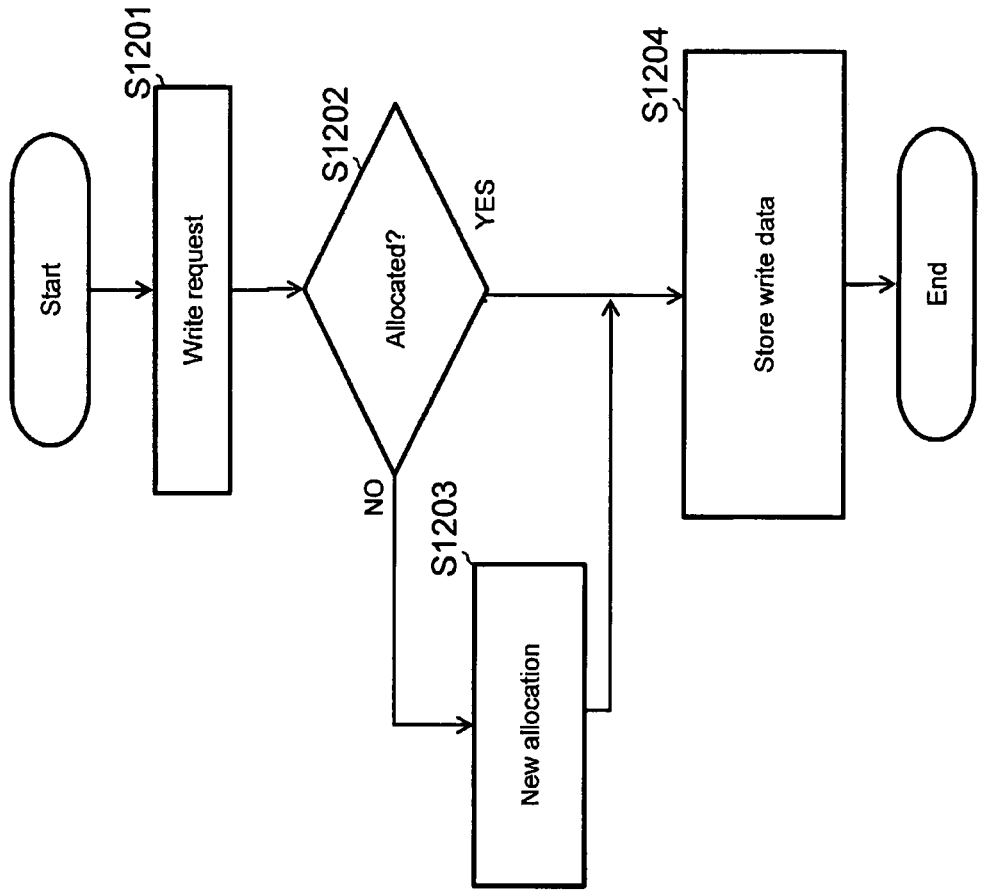
FIG. 12 is a flowchart of a data write process.

FIG. 12 is a flowchart of a data write process.

In S1201, the I/O program 611 receives a write request issued from the host 10. The I/O program 611 analyzes this write request and identifies the write-destination virtual page, which belongs to the TPVOL specified in this write request, and the address specified in this write request.

In S1202, the I/O program 611 decides whether a real page 202 has been allocated to the write-destination virtual page (that is, whether or not the write-destination virtual page is a used virtual page). Specifically, for example, the I/O program 611 refers to the VP configuration table 603 and identifies IDs 803 and 804, which correspond to the ID 801 of the write-destination TPVOL and the ID 802 of the write-destination virtual page identified in S1201. In a case where the identified IDs 803 and 804 are values signifying allocated (in the example of FIG. 8, a numeral is listed), the I/O program 611 moves to S1204. Alternatively, in a case where the identified IDs 803 and 804 are values signifying unallocated (in the example of FIG. 8, "FFFF" is listed), the I/O program 611 moves to S1203.

In S1203, the I/O program 611 allocates an allocatable real page 202 to the write-destination virtual page from the pool 300. Specifically, for example, the I/O program 611 identifies the ID 1001 of a real page for which the values of IDs 1004 and 1005 signify unallocated ("FFFF" in the example of FIG. 10) from the RP configuration table 607. The I/O program 611 registers the ID of the write-destination TPVOL and the ID of the write-destination virtual page in the table 607 as 1004 and 1005 corresponding to the identified ID 1001. Also, the I/O program 611 updates the number of UVPs 704 and the number of URPs 705 in the TPVOL configuration table 601, updates the IDs 803 and 804 in the VP configuration table 603, and updates the number of URPs 905 in the pool VOL configuration table 605.

In S1204, the I/O program 611 stores write data conforming to the write request received in S1201 in the real page 202 allocated to the write-destination virtual page. Specifically, for example, the I/O program 611 refers to the VP configuration table 603, identifies ID 803 and ID 804 corresponding to the write-destination virtual page, and stores the write data in the real page 202 identified from the identified IDs 803 and 804.

Figure 13:
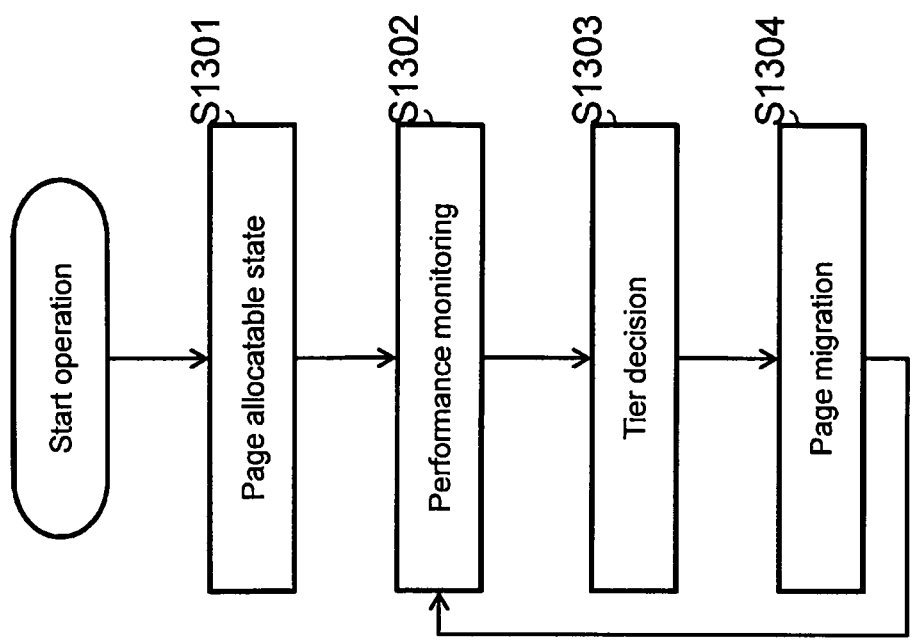
FIG. 13 is a flowchart of pool operation processes.

FIG. 13 is a flowchart of pool operation processes.

This processing starts when the pool 300 in the storage system 100 has begun operating.

In S1301, the storage system 100 transitions to a state in which a page is able to be allocated. That is, the status becomes such that the above-mentioned data write process (refer to FIG. 12) is able to be performed.

In S1302, the performance monitoring program 612 monitors the number of reads/writes (that is, the I/O frequency) for a real page (virtual page). Specifically, for example, the performance monitoring program 612 monitors either the reads or the writes with respect to the real pages, and updates the IOPS 1006 in the RP configuration table 607 for a real page for which a read or write has occurred.

In S1303, the performance monitoring program 612 decides whether or not a real page that is not in the appropriate tier exists. Specifically, for example, the performance monitoring program 612 decides for each real page whether or not the IOPS 1006 of the real page is appropriate for the tier ranking 907 of the pool VOL comprising this real page (for example, whether or not the IOPS 1006 of the real page belongs to the range of IOPS corresponding to the tier ranking 907 of the pool VOL comprising this real page). In a case where the result of this decision is negative, the performance monitoring program 612 moves to S1304. Alternatively, in a case where the result of this decision is affirmative, the performance monitoring program 612 returns to S1302 without performing the processing of S1304.

In S1304, the page migration program 613 performs a page migration. Specifically, for example, the page migration program 613 migrates the data inside the real page for which it was decided in S1303 that the tier ranking is inappropriate to an allocatable real page (a free real page) 202 inside a pool VOL with a tier ranking that is appropriate for the IOPS 1006 of this real page. The migration-destination real page is allocated to the virtual page allocated to the migration-source real page in place of the migration-source real page. The migration-source real page may be overwritten with 0 data, which is an example of a prescribed data.

The processing from S1302 to S1304 described above may be performed for each pool 300 of the storage system 100. Also, S1302 may be performed regularly (or irregularly).

The conversion process from the target normal VOL to the target TPVOL, which is one of the characteristic features of this example, will be explained below. This explanation will be divided into a case in which the target normal VOL is an internal VOL, and a case in which it is an externally-coupled VOL.

<Case where Target Normal VOL is Internal VOL>

Figure 14:
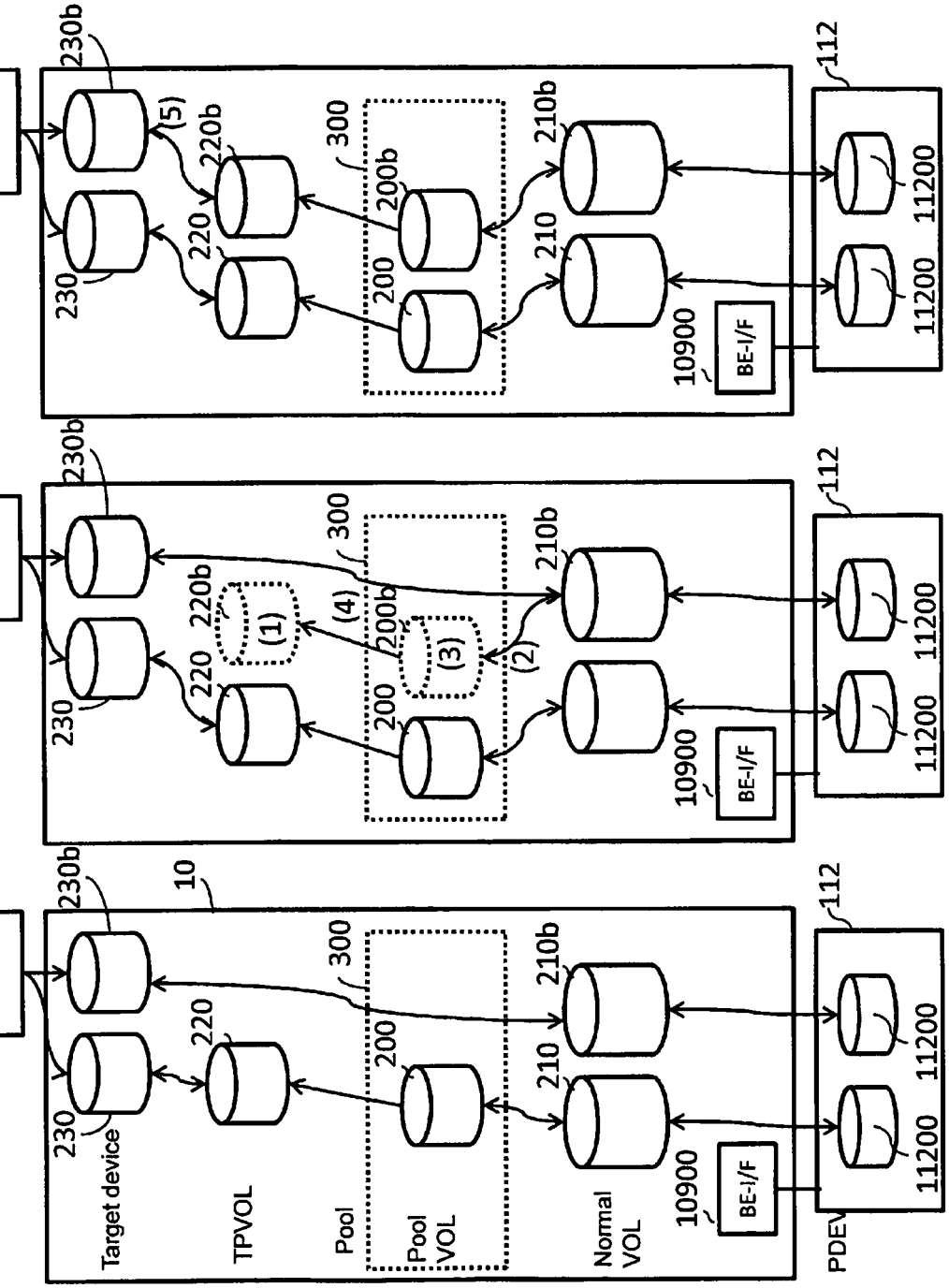
FIG. 14A shows an example of the state prior to the conversion from a target internal VOL to a TPVOL.
FIG. 14B shows a portion of the conversion process from the target internal VOL to the TPVOL.
FIG. 14C shows the remainder of the conversion process from the target internal VOL to the TPVOL.

FIGS. 14A through 14C show an overview of the flow of processing for converting a target normal VOL (a target internal VOL), for which an I/O has been issued from the host 10, to a target TPVOL.

As shown in FIG. 14A, it is supposed that a target internal VOL 210b is specified in an I/O request from the host 10, and that the state is such that data is to be input/output in accordance with this I/O request.

In order to make this target internal VOL 210b a target TPVOL, the VOL conversion program 615 performs the following processes (1) through (4) shown in FIG. 14B, and the following process (5) shown in FIG. 14C:

(1) creates a new TPVOL 220b associated with the pool 300;

(2) incorporates the target internal VOL 210b into the pool 300 (In accordance with this, the target internal pool 210b becomes a target pool VOL 200b);

(3) partitions the target pool VOL 200b into multiple pages (during this partitioning process, it may be decided whether or not each real page in the target pool VOL 200b is a valid real page);

(4) associates the TPVOL 220b with the target pool VOL 200b (Specifically, for example, only a valid real page of the multiple real pages in the target pool VOL 200b may be allocated to a virtual page in the target TPVOL corresponding to the location of this valid real page); and (5) associates the TPVOL 220b with a target device 230b, which is associated with the target internal VOL 210b.

According to (1) through (4) above, the target internal VOL 210b is converted to the target TPVOL, and according to (5) above, the target TPVOL transitions to a state in which it is accessible from the host 10. Furthermore, for example, any of the following (A) through (C) may be used with respect to this series of processes (1) through (5).

(A) The above-described series of processes (1) through (5) may be performed without suspending the reception from the host 10 of an I/O request specifying a target internal VOL (specifically, for example, the target device 230b with which this internal VOL is associated) even though the processing for converting the internal VOL 210b to the TPVOL has started. For example, the I/O program 611, upon receiving the I/O request specifying the internal VOL 210b that is in the process of being converted to the TPVOL, may, in a case where this I/O request is a read request, process this read request. In a case where the I/O request is a write request, the I/O program 611 may temporarily write the data conforming to this write request to the CM 10302. Then, after the VOL conversion process (the process for converting the normal VOL to the TPVOL) has ended, the I/O program 611 may allocate a real page to the write-destination virtual page and write the data in the CM 10302 to the real page.

(B) The reception of an I/O request from the host 10 specifying a target internal VOL may be suspended when the process for converting from an internal VOL 210b to a TPVOL has started. Thereafter, when the process for converting from the internal VOL 210b to the TPVOL has ended, the reception of the I/O request from the host 10 specifying the target internal VOL may be resumed.

(C) All the pages into which the target pool VOL 200b was partitioned may be allocated one time to the entire TPVOL, thereafter, a decision as to whether each real page is a valid real page may be made, and the allocation from the TPVOL 220b of a real page, which has been decided to be an invalid real page, may be cancelled (Furthermore, FIGS. 19 and 20, which will be explained further below, are this (C) type).

Figure 15:
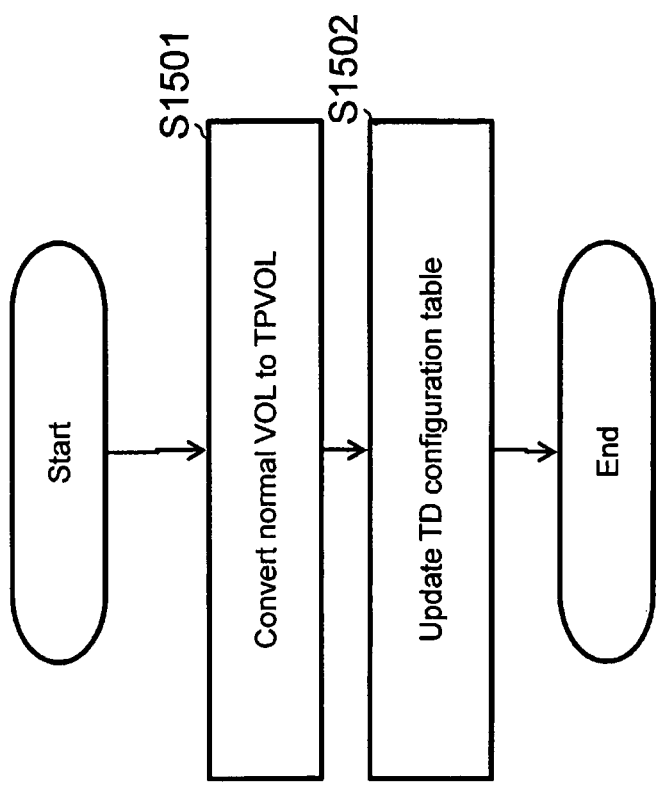
FIG. 15 is a flowchart of the processing up to the state in which the target internal VOL is accessible from the host 10 as the TPVOL.

FIG. 15 is a flowchart of the process up to the state when the target internal VOL becomes accessible from the host 10 as the TPVOL.

In S1501, the VOL conversion program 615 performs the process for converting from the target internal VOL to the TPVOL (processes (1) through (4) above).

In S1502, the VOL conversion program 615 associates the TPVOL, to which the target internal VOL was converted, with the target device, with which the target internal VOL had been associated, by updating the TD configuration table 609 (process (5) above).

Figure 16:
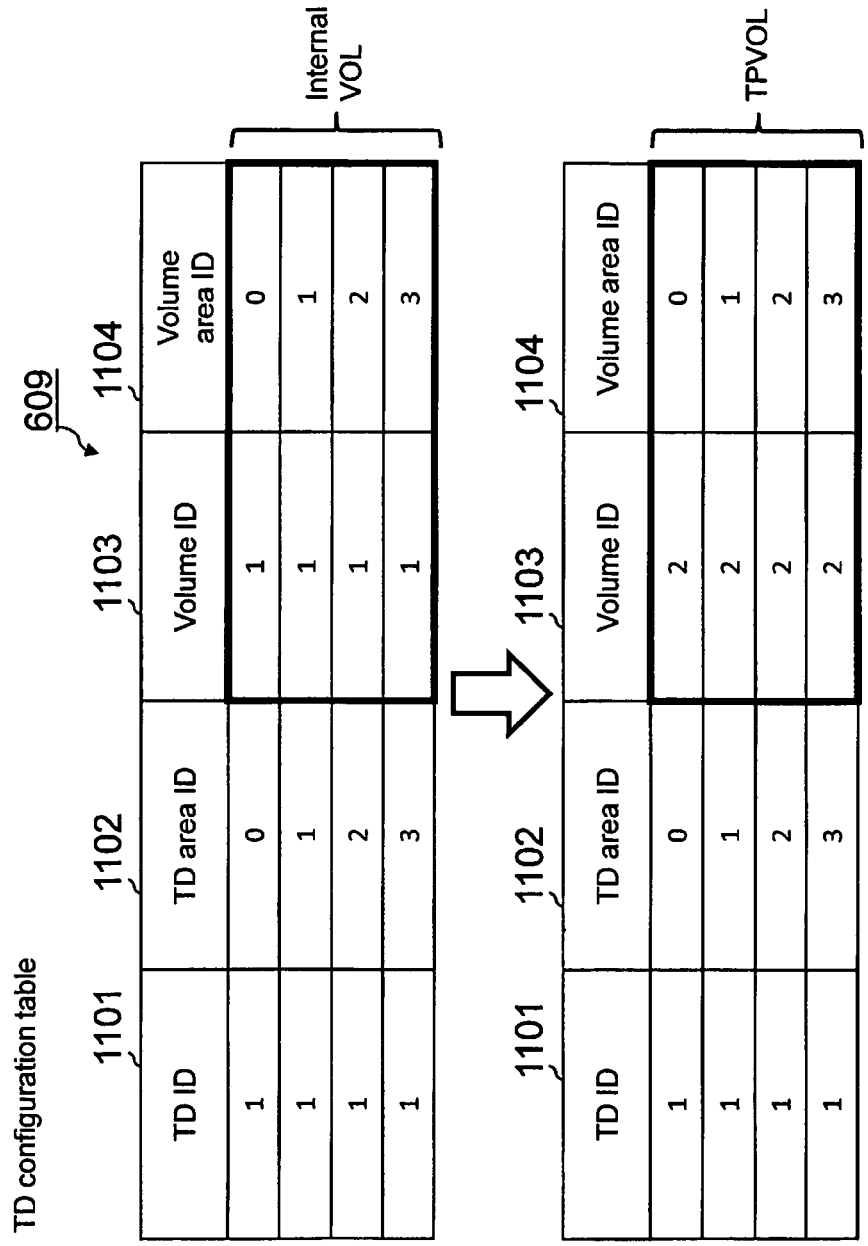
FIG. 16 is a diagram illustrating S1502 of FIG. 15.
Figure 17:
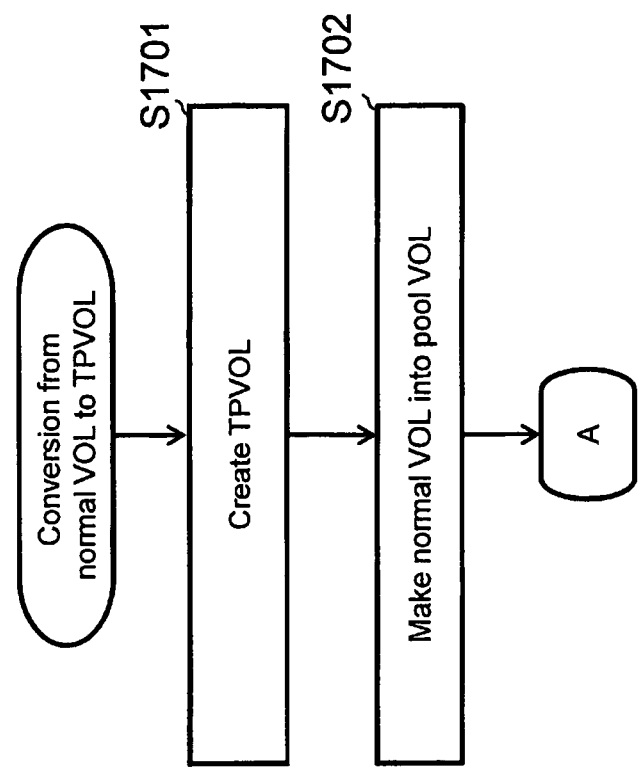
FIG. 17 is the first part of a flowchart of S1501 of FIG. 15.

FIG. 16 is a diagram illustrating S1502 of FIG. 15 (the updating of the TD configuration table 609).

The program 615 converts the ID 1103 corresponding to the target device with which the target internal VOL has been associated from the ID of the target internal VOL to ID of the target TPVOL.

FIGS. 17 through 20 are flowcharts of S1501 of FIG. 15 (process for converting from the internal VOL to the TPVOL).

In S1701, the program 615 creates a TPVOL 220b. Specifically, for example, the program 615 creates a TPVOL 220b having a capacity, which is equal to or larger than the capacity of the internal VOL 210b, and which is a multiple of the page size. This is because the internal VOL 210b (the pool VOL 220b) is partitioned into multiple pages (areas of a prescribed size) afterwards. That is, when the internal VOL 210b is segmented into areas of the same size, ultimately, there is the likelihood of an area of a size that is less than one page remaining, but in a case where the capacity of the TPVOL 220b is equal to or larger than the capacity of the internal VOL 210b and is a multiple of the page size, an area that is less than one page in size may remain without causing a problem.

In S1702, the program 615 makes the internal VOL 210b a pool VOL 200b by incorporating the internal VOL 210b into the pool 300.

In S1703, the program 615 decides whether or not an area of the pool VOL 200b, which has yet to be partitioned into pages (hereinafter, unpartitioned area), has a capacity of equal to or larger than the desired one page. In a case where the result of the decision is that the unpartitioned area is equal to or larger than one page, the program 615 moves to S1706 of FIG. 19. In a case where the result of the decision is that the unpartitioned area is less than one page, the program 615 moves to S1709 of FIG. 20.

In S1706 (FIG. 19), the program 615 partitions the unpartitioned area in the pool VOL 200 from the start area into one page worth of capacity, and creates one real page.

In S1707, the program 615 allocates the RP ID in pool VOL 1003 (refer to FIG. 10) to the real page obtained in S1706. For example, the program 615 may allocate as the ID 1003 of the real page obtained in S1706 a value that has not yet been allocated as an allocation ID 1003. An RP ID 1001 in the pool 300 may also be allocated here.

In S1708, the program 615 allocates the obtained real page to a virtual page, which is in a location that corresponds to the location of this real page, and registers the corresponding relationship between this real page and the allocation-destination virtual page of this real page in the RP configuration table 607. Specifically, for example, the program 615 registers the ID 1002 of the pool VOL comprising the obtained real page, the ID 1003 that was allocated to the obtained real page, the ID 1004 of the TPVOL 220*b*, and the ID 1005 of the allocation-destination virtual page of the obtained real page in the RP configuration table 607. This S1708 is performed even when valid data is not stored in the obtained real page (for example, even when only 0 data is stored in the real page. By performing this S1708 each time a real page is obtained, the rows shown in RP ID 1001 "15" through "19" of FIG. 21 are added to the RP configuration table 607.

In S1704 (FIG. 18), the program 615 updates the TPVOL configuration table 601, the VP configuration table 603, and the pool VOL configuration table 605. For example, the number of UVPs 704 of the allocation-destination TPVOL 220*b* is incremented by 1, the number of URPs 705 is updated, the IDs 803 and 804 of the real page allocated to the allocation-destination virtual page are registered in the ID 802 of this virtual page, and the total number of pages 904 and the number of URPs 905 are incremented by 1 with respect to the target pool VOL 200*b* that obtained the real page.

In S1705, the program 615 decides whether or not all the areas inside the internal VOL 210*b* have been partitioned. In a case where all the areas have not been partitioned, the program 615 returns to S1703. Alternatively, in a case where all the areas have been partitioned, the program 615 ends the processing.

Figure 18:
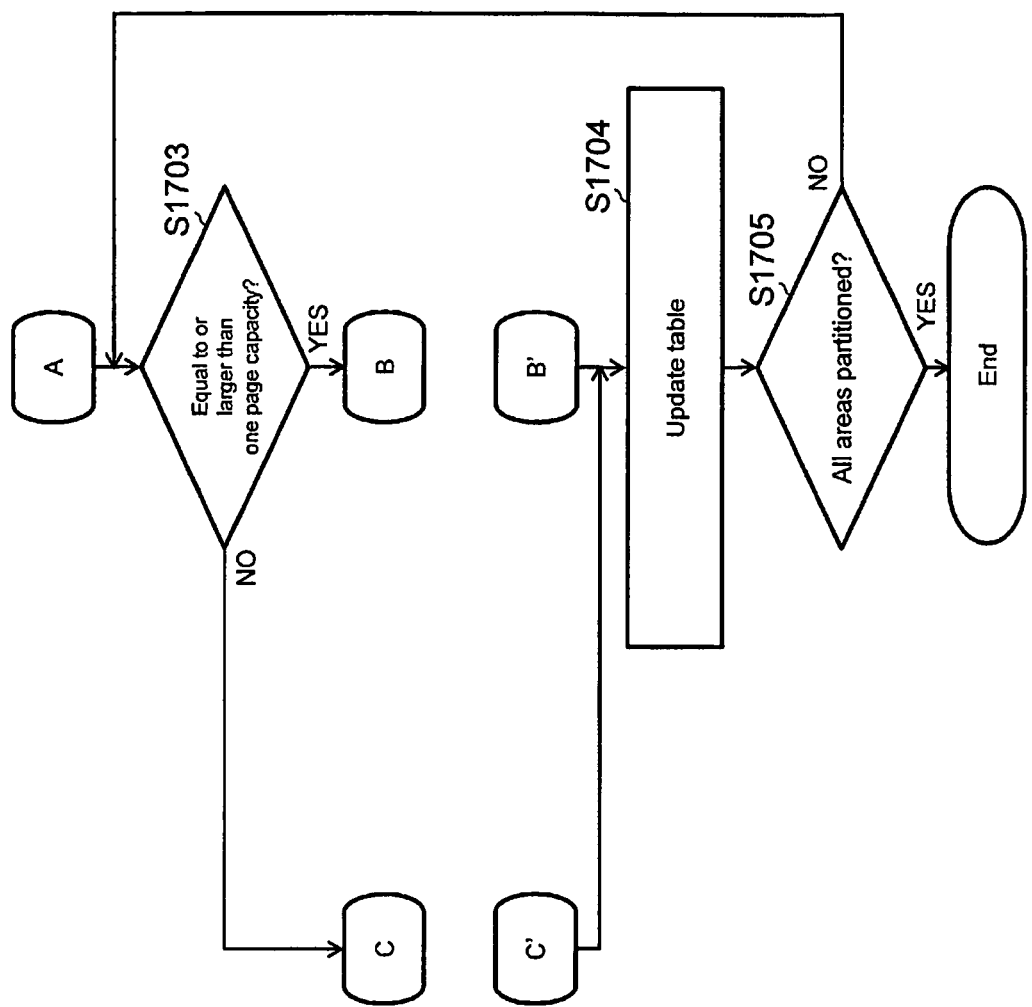
FIG. 18 is the second part of the flowchart of S1501 of FIG. 15.
Figure 20:
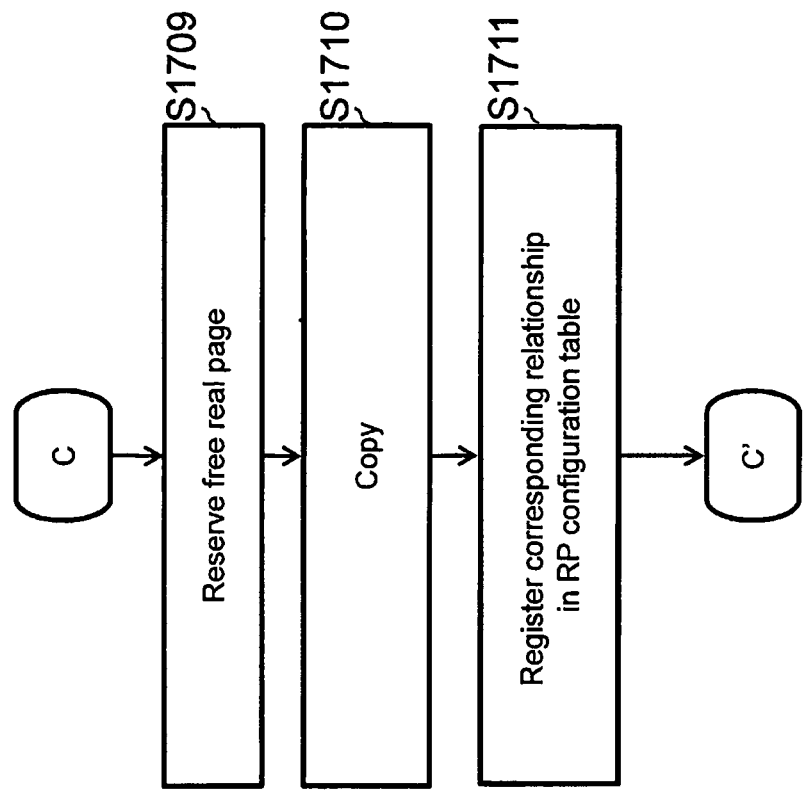
FIG. 20 is the remainder of the flowchart of S1501 of FIG. 15.

Now then, in a case where the result of the decision in S1703 of FIG. 18 is negative, that is, a case in which the unpartitioned area is less than one page capacity, S1709 of FIG. 20 is performed.

In S1709, the program 615 reserves a free real page of another pool VOL 200 in the pool 300.

In S1710, the program 615 copies the data in the unpartitioned area of the internal VOL 210*b* (an area of less than one page capacity) to the real page reserved in S1709. The program 615 stores 0 data in the surplus area of the copy-destination real page.

In S1711, the program 615 allocates the copy-destination real page to the virtual page at the end of the TPVOL 220*b*, and registers the corresponding relationship between this real page and the allocation-destination virtual page of this real page in the RP configuration table 607. Specifically, for example, the program 615 registers the ID 1002 of the pool VOL comprising the copy-destination real page, the ID 1003 of the copy-destination real page, the ID 1004 of the TPVOL 220*b*, and the ID 1005 of the allocation-destination virtual page of the copy-destination real page in the RP configuration table 607. When this S1711 is performed, for example, the pool VOL ID 1002 in row "19" of ID 1001 in FIG. 21 is not "3", but rather transitions to the ID 1002 of another pool VOL.

After S1711, the above-described S1704 of FIG. 18 is performed. In a case where S1711 was performed, the result of the determination of S1705 is typically affirmative, and the processing ends.

According to the flows of processing shown in FIGS. 15 through 20 described above, the target internal VOL 210*b* can be provided to the host 10 as the TPVOL 220*b* without all of the data from the start to the end of the target internal VOL 210*b* being migrated to the TPVOL. This makes it possible to alleviate a decrease in I/O performance in the storage system 100 since there is no load resulting from a migration from the internal VOL 210*b* to the TPVOL 220.

Furthermore, the following variations can be used in Example 1.

<1: Processing of FIG. 19 in Series of Processes Shown in FIGS. 15 Through 20 May be Replaced by the Processing of FIGS. 22>

Figure 19:
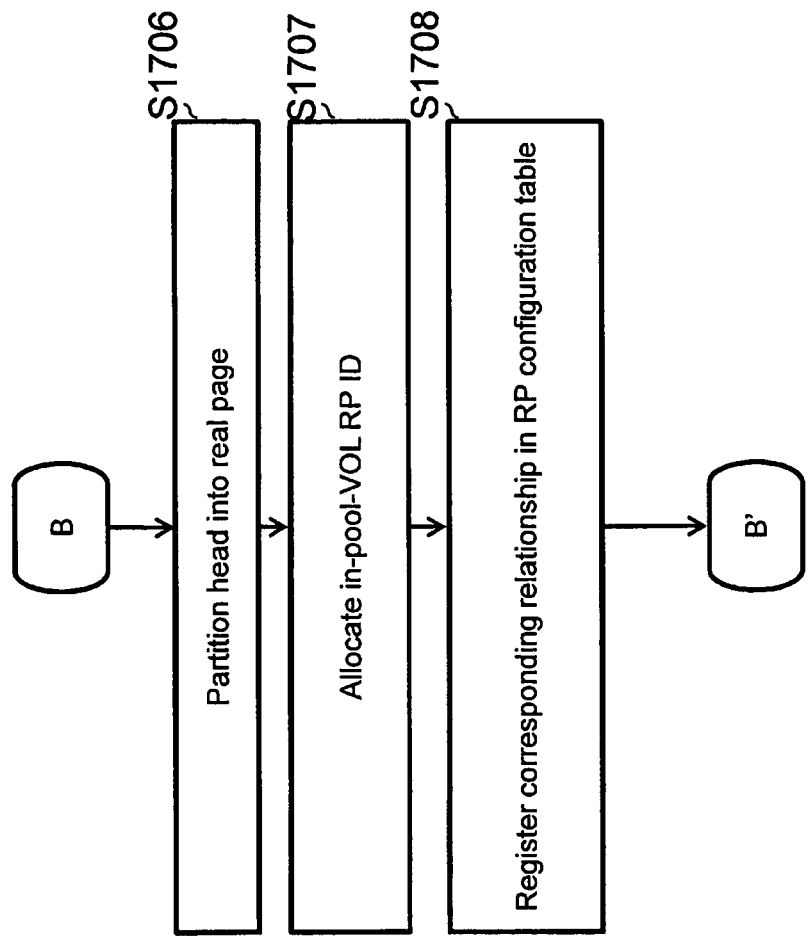
FIG. 19 is the third part of the flowchart of S1501 of FIG. 15.

S2201 and S2202 are substantially the same as S1706 and S1707 of FIG. 19.

In S2203, the program 615 decides whether or not a partitioned real page is an invalid real page (for example, a real page in which only 0 data is stored). In a case where the result of the decision is affirmative, the program 615 moves to S2204. Alternatively, in a case where the result of the decision is negative, the program 615 moves to S2206. S2206 is substantially the same as S1708 of FIG. 19.

In S2204, the program 615 registers information in the RP configuration table 607 to the effect that the real page obtained in S2201 is not allocated to a virtual page of the TPVOL. Specifically, for example, as shown in FIG. 24A, the program 615 registers "FFFF" in the RP configuration table 607 as the IDs 1004 and 1005 corresponding to the IDs 1002 and 1003 of the obtained real page, and as the IOPS 1006.

In S2205, the program 615 registers information in the VP configuration table 603 to the effect that the real page obtained in S2201 is not allocated to a virtual page of the TPVOL. Specifically, for example, as shown in FIG. 24B, the program 615 registers "FFFF" in the VP configuration table 603 as the ID 803 and the ID 804 corresponding to the virtual page, which is in a location that corresponds to the location of the obtained real page.

Figure 25:
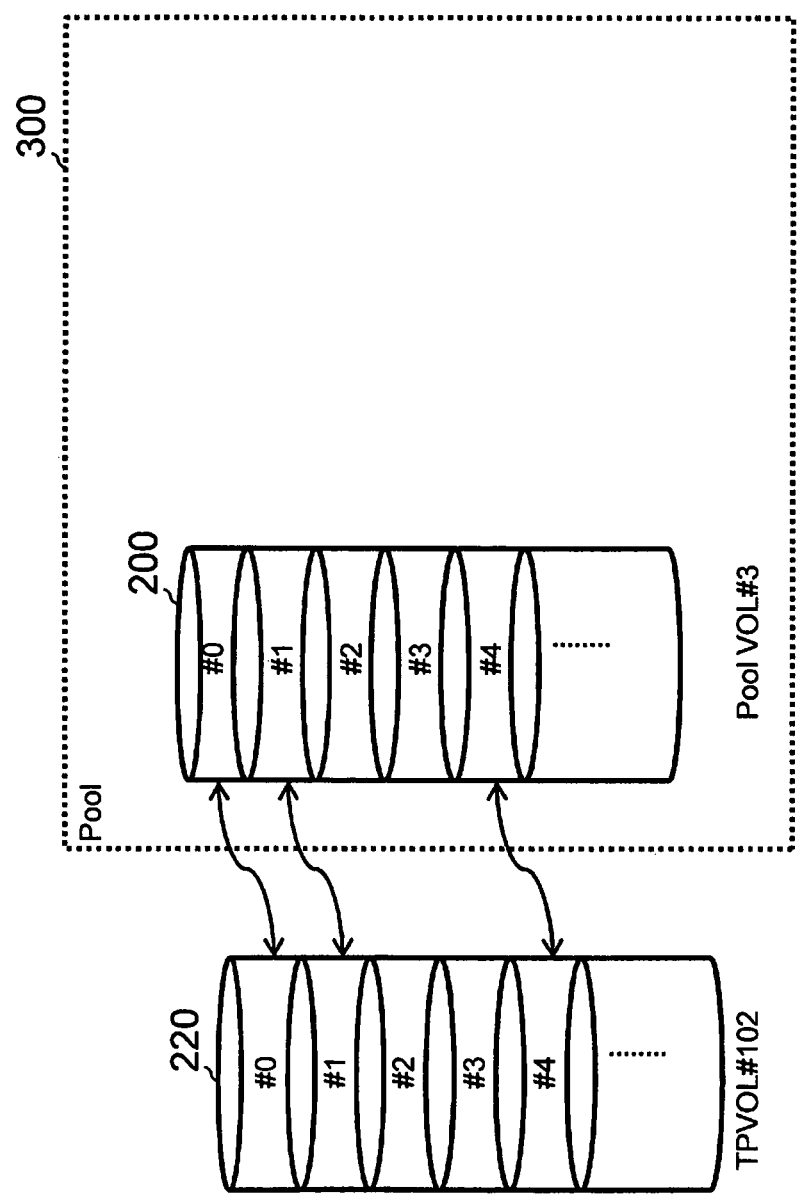
FIG. 25 shows an example of the allocation of a real page inside a target pool VOL to a TPVOL with respect to the variation.

In so doing, in a case where the obtained real page is an invalid page, this real page is not allocated to a TPVOL virtual page. For example, since real pages #2 and #3 in rows "17" and "18" of ID 1001 in FIG. 24, and in pool VOL #3 shown in FIG. 25 are invalid pages, these real pages #2 and #3 are not allocated to the virtual pages #2 and #3 in the TPVOL #102.

<2: Processing of FIG. 20 in Series of Processes Shown in FIGS. 15 Through 20 May be Replaced by the Processing of FIG. 23>

S2301 is substantially the same as S1709 of FIG. 20.

In S2302, the program 615 decides whether or not only 0 data is stored in an unpartitioned area of the internal VOL 210*b*. In a case where the result of this decision is affirmative, the program 615 moves to S1704. Alternatively, in a case where the result of this decision is negative, the program 615 moves to S2303. S2303 and S2304 are substantially the same as S1710 and S1711 of FIG. 20.

<3: Program 615 May Selectively Decide Whether to Perform Processing Shown in FIGS. 19 and 20 or Processing Shown in FIGS. 22 and 23>

Figure 22:
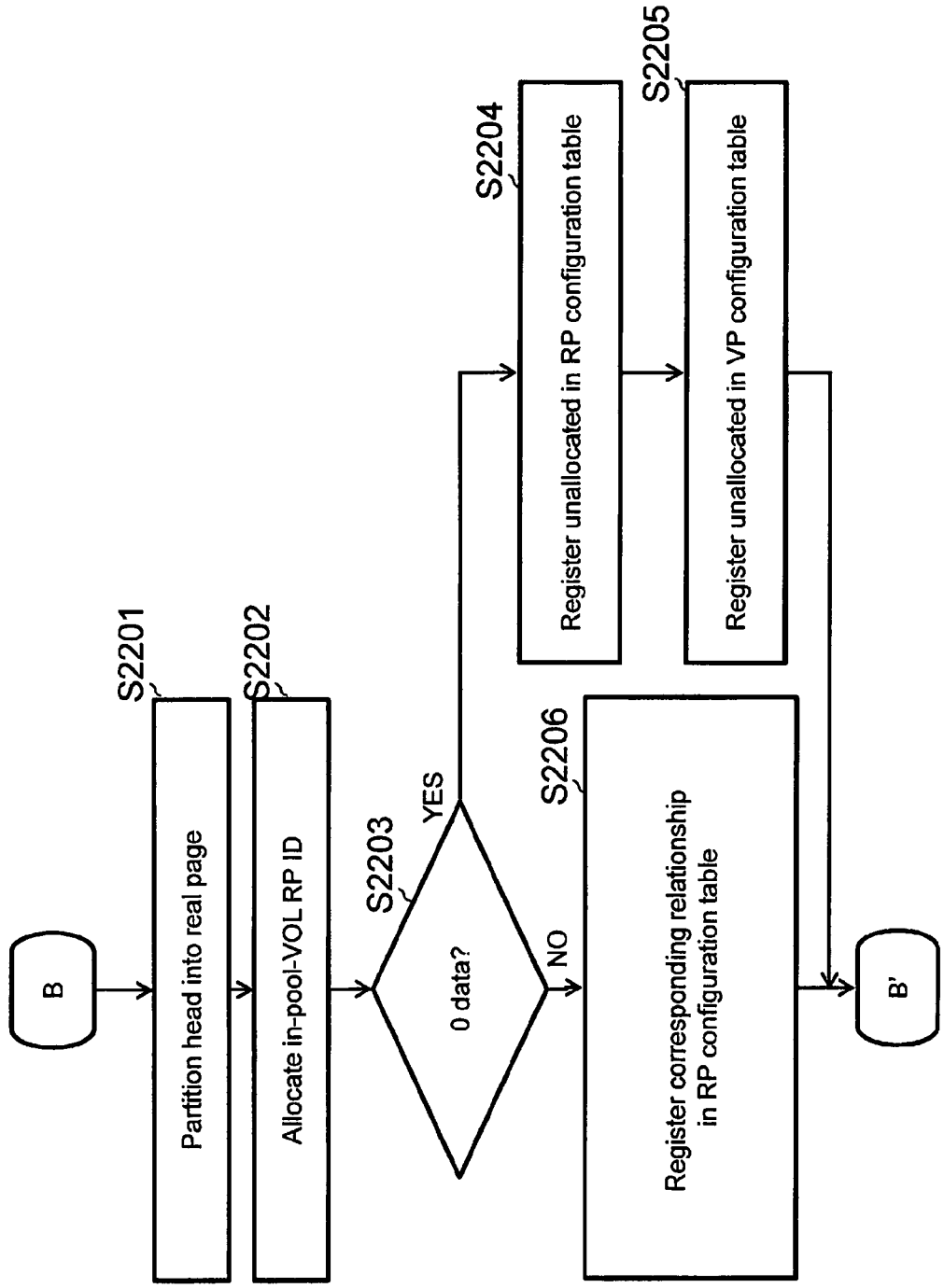
FIG. 22 is a variation of the processing shown in FIG. 19.
Figure 23:
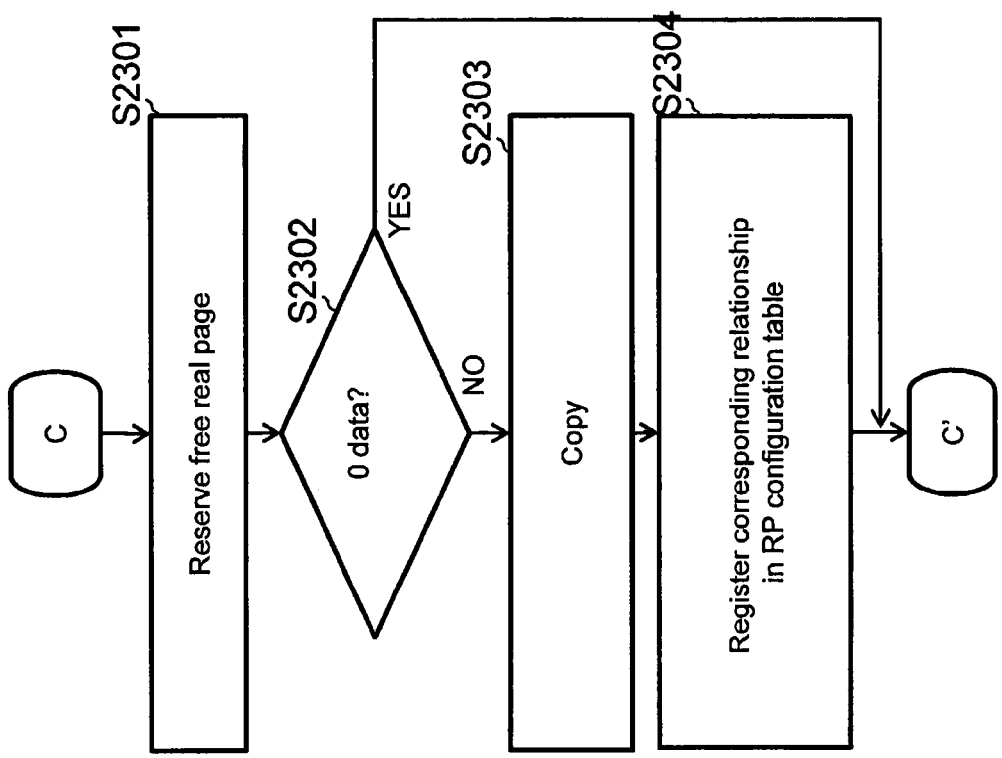
FIG. 23 is a variation of the processing shown in FIG. 20.
Figure 34:
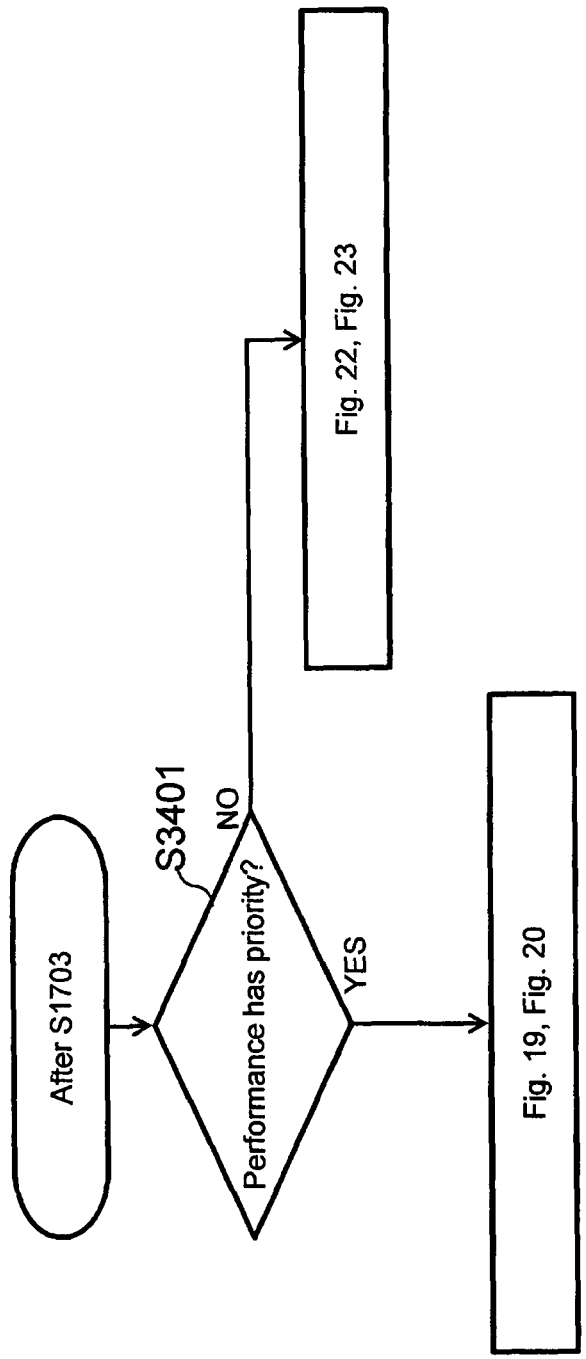
FIG. 34 shows a decision as to whether or not performance is prioritized in Example 1.

For example, the program 615 makes a decision as to whether or not performance is the priority as shown in FIG. 34 (S3401), and in a case where the result of this decision is affirmative, may perform the processing of FIGS. 19 and 20, and in a case where the result of this decision is negative (for example, when the priority is capacity efficiency), may perform the processing of FIGS. 22 and 23. The decision of S3401, for example, may be made when S1703 is either YES or NO. Performance priority, for example, signifies that the emphasis is placed more on performing the processing for converting the target normal VOL to the TPVOL at high speed than on capacity efficiency in which real pages are used as little as possible.

Now then, the preceding is an explanation of a case (the first case) in which the target normal VOL is an internal VOL. Next, a case (the second case) in which the target normal VOL is an externally-coupled VOL will be explained. In so doing, the explanation will focus on the points of difference with the first case, and explanations of the points in common with the first case will be simplified or omitted.

<Case in which Target Normal VOL is Externally-Coupled VOL>

A second variation of the first embodiment will be explained below.

FIGS. 26A through 26C show an overview of the flow of processing for converting a target normal VOL (a target externally-coupled VOL), for which an I/O has been issued from the host 10, to a target TPVOL.

In the flows of processing shown in FIGS. 26A through 26C, (11) through (15) are substantially the same as (1) through (5) shown in FIGS. 14A through 14C, and the point of difference is simply the fact that the target normal VOL is an external VOL 210c rather than an internal VOL 210b. In FIG. 26B and FIG. 26C, a TPVOL 220c is created, and the externally-coupled VOL 210c is regarded as a pool VOL 200c.

In this case, the target externally-coupled VOL 210c is converted to the target TPVOL 220c in accordance with the processing of (11) through (15).

Figure 27B:
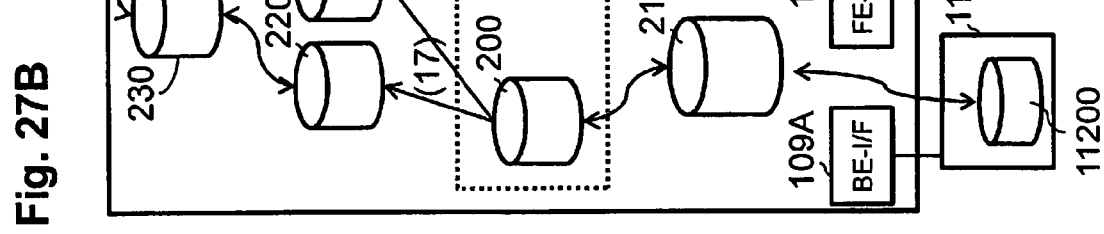
FIG. 27B shows the allocation of a migration-destination real page to a virtual page, and the removal of an external storage 12.
Figure 27A:
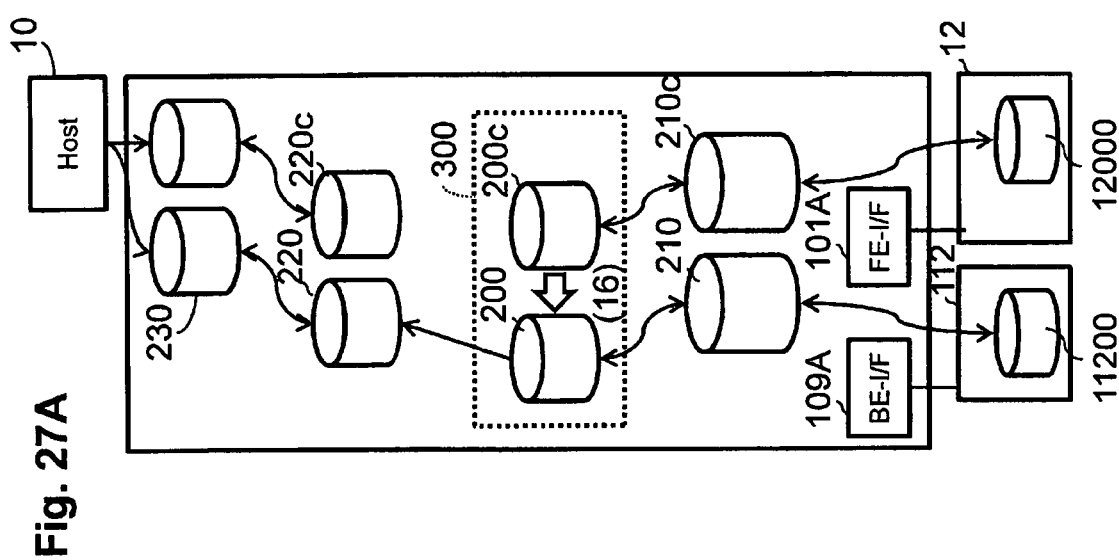
FIG. 27A shows a migration of data from a target pool VOL (target externally-coupled VOL) to another pool VOL (internal VOL).

Thereafter, the following processes (16) through (18) shown in FIG. 27A and FIG. 27B are performed.

(16) The page migration program 613 migrates valid data inside the pool VOL 200c to a pool VOL 200 that serves as an internal VOL 210 in the pool 300.

(17) The page migration program 613 allocates the migration-destination real page to the virtual page, which was the allocation destination of the migration-source real page, in place of the migration-source real page (the real page in the pool VOL 200c serving as the externally-coupled VOL 210c).

(18) After the processing of (16) and (17) has been performed for all the valid data in the pool VOL 200c, the external storage 12 is removed from the storage system 100.

According to the above-mentioned processes (11) through (15), all of the data from the start to the end of the target externally-coupled VOL 210c can be provided from the target externally-coupled VOL 210c to the host 10 as the TPVOL 220c without being migrated to the TPVOL. This makes it possible to alleviate a decrease in I/O performance in the storage system 100 since there is no load resulting from a migration from the externally-coupled VOL 210c to the TPVOL 220.

Also, according to the processes (16) through (18), all the valid data in the pool VOL 200c (the externally-coupled VOL 210c) is migrated to one or more other pool VOLs (internal VOLs) in the pool 300 comprising this pool VOL 200c, and the external storage 12, which comprises the external VOL for which the externally-coupled VOL 210c is the mapping destination, is removed. This external storage 12 can be used in another storage system.

Figure 28:
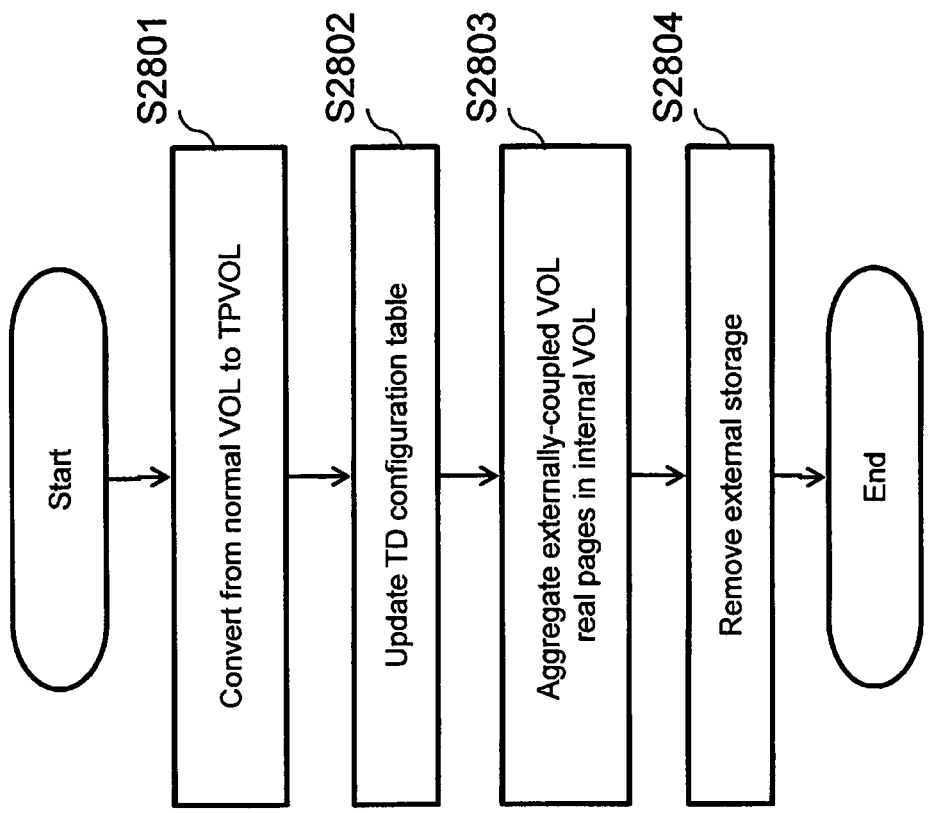
FIG. 28 is a flowchart of a series of processes in which a target externally-coupled VOL is regarded as being in a state capable of being accessed from the host 10 as the TPVOL, and an external storage is removed.

FIG. 28 is a flowchart of a series of processes via which a target externally-coupled VOL is changed to a state in which it is accessible from the host 10 as a TPVOL, and the external storage is removed.

Figure 29:
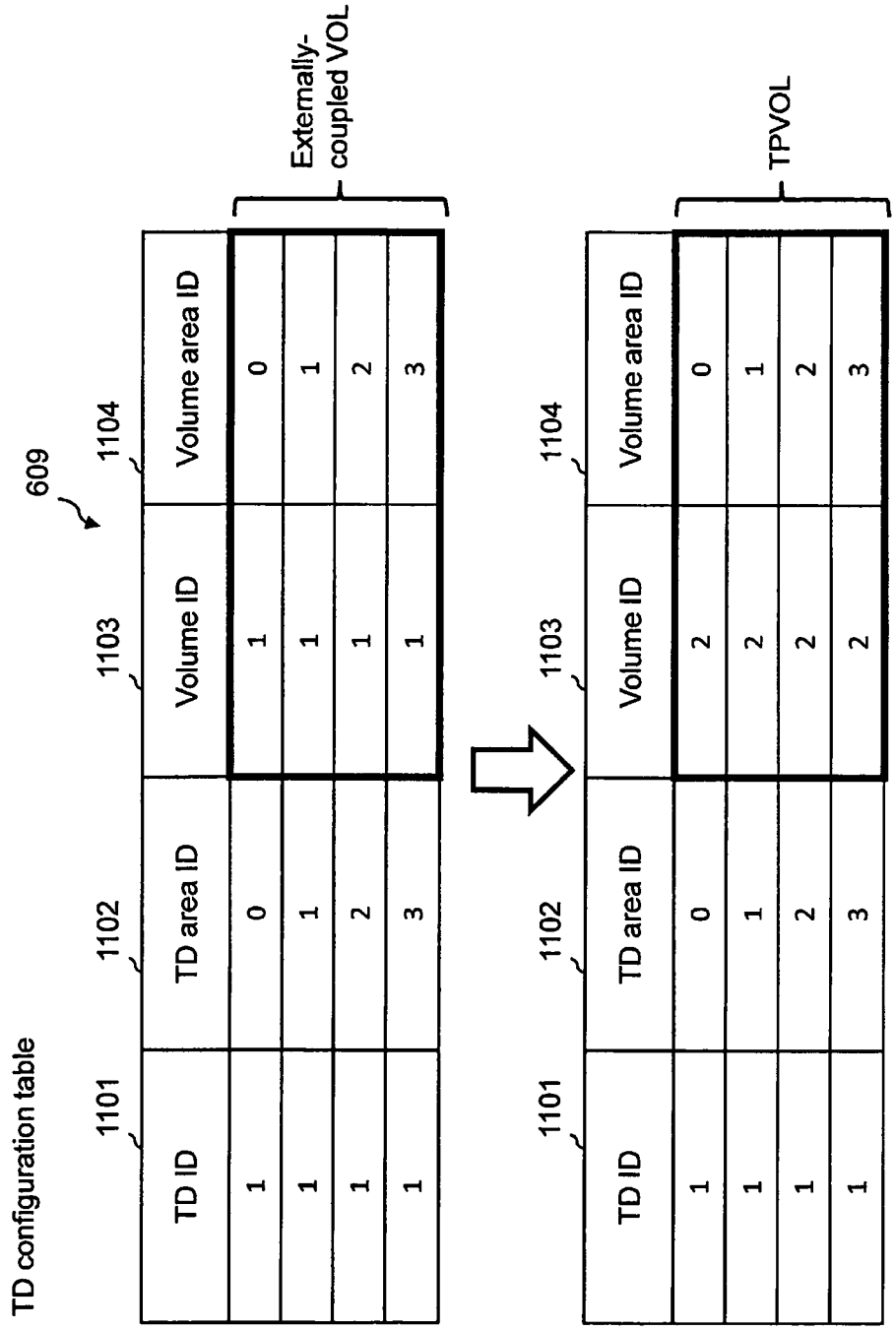
FIG. 29 is a diagram illustrating S2802 of FIG. 28.

S2801 and S2802 correspond to the processes (11) through (15), and are substantially the same as S1501 and S1502 of FIG. 15. Furthermore, in S2802, as shown in FIG. 29, the allocation-destination TPVOL of a real page in the target pool VOL (target externally-coupled VOL) is associated with the target device, with which the target externally-coupled VOL has been associated.

S2803 corresponds to the processing of (16) and (17) described above. The page migration program 613 migrates data stored in a real page in the pool VOL 200c serving as the externally-coupled VOL 210c to one or more other pool VOLs 200 serving as internal VOLs 210 in the pool 300 comprising this pool VOL 200c. The migration-destination pool VOL 200 (internal VOL 210) may be decided in one of several ways. For example, the migration-destination pool VOL 200: (a) may be one migration-destination pool VOL 200 for one migration-source target pool VOL; (b) may be decided randomly; (c) may be decided in round-robin fashion, and the data distributed evenly among multiple pool VOLs (internal VOLs); (d) may be a pool VOL 200 for realizing rebalancing in which used real pages become evenly distributed among multiple pool VOLs; or (e) may be regarded as a pool VOL 200 for realizing a reallocation in which data inside a real page is arranged in the pool VOL 200 belonging to a tier that is appropriate for the IOPS 1006 of this real page.

In S2804, the external storage 12 is removed from the storage system 100.

The preceding is the flow of a series of processes related to this case.

The rebalance function and reallocation function of the page migration program 613 will be explained below.

Figure 30:
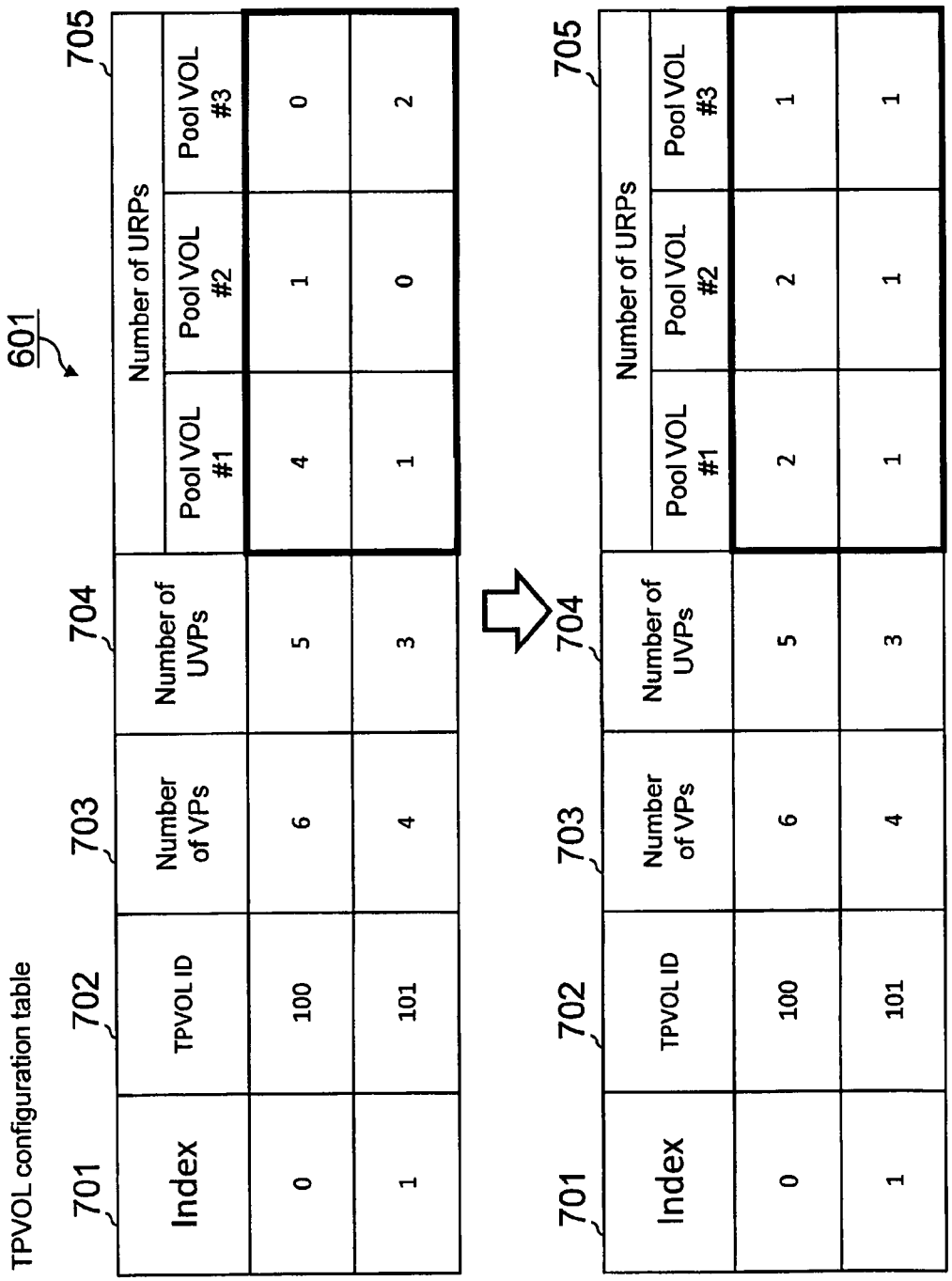
FIG. 30 is a diagram for illustrating a rebalance function.

FIG. 30 is a diagram for illustrating the rebalance function.

The rebalance function is for evening out the real pages 202 allocated from multiple pool VOLs 200 in the pool 300 for each TPVOL 220. Specifically, as shown in the TPVOL configuration table 601 at the top of FIG. 30, real pages are not allocated uniformly from the multiple pool VOLs #1 through #3 in the TPVOLs #100 and #101. Specifically, for example, with respect to TPVOL #100, the greatest number of the real pages are allocated from pool VOL #1 and no real pages are allocated from pool VOL #3.

According to the rebalance function, real pages are allocated to each of the TPVOLs #100 and #101 uniformly from the multiple pool VOLs #1 through #3 as shown in the table 601 at the bottom of FIG. 30. For example, the page migration program 615 can realize the uniform arrangement shown in the lower portion of FIG. 30 by migrating the data inside one real page of the four real pages allocated from pool VOL #1 to TPVOL #100 to pool VOL #2, and migrating the data inside another real page of these four real pages to pool VOL #3. This rebalance processing may be performed at prescribed intervals.

According to the rebalance function, multiple real pages allocated to one TPVOL are uniformly distributed among multiple pool VOLs, and even when I/Os are concentrated on one TPVOL, the I/Os can be expected to be distributed among multiple pool VOLs.

FIG. 31 is a diagram for illustrating the reallocation function.

According to the reallocation function, data in a real page (or a virtual page) is migrated to a real page of a pool VOL belonging to a tier that is appropriate for the IOPS 1006 of this real page (or virtual page).

For example, it is supposed that the tier ranking (typically, the I/O performance) of pool VOL #0 is the highest, the tier ranking of pool VOL #1 is the next highest, and the tier ranking of pool VOL #2 is the next highest.

In accordance with this, for example, since the IOPS 1006 of the real pages for which the ID 1001 is "0" and "1" are low at "1" and "2", the data inside the real pages for which the ID 1001 are "0" and "1" is migrated to real pages in pool VOL #2, which is the low tier. Alternatively, since the IOPS 1006 of the real pages for which the ID 1001 is "10" and "11" are high at "6" and "5", the data inside the real pages for which the ID 1001 are "10" and "11" is migrated to real pages in pool VOL #0, which is the high tier.

The relationship between the rebalance and the reallocation may be as follows. For example, preference may be given to a reallocation that is performed based on the IOPS 1006. In so doing, in a case where there are multiple pool VOLs in the same tier, a rebalance may be performed so that the allocation-destination data is not disproportionately migrated to the same pool VOL.

Figure 32:
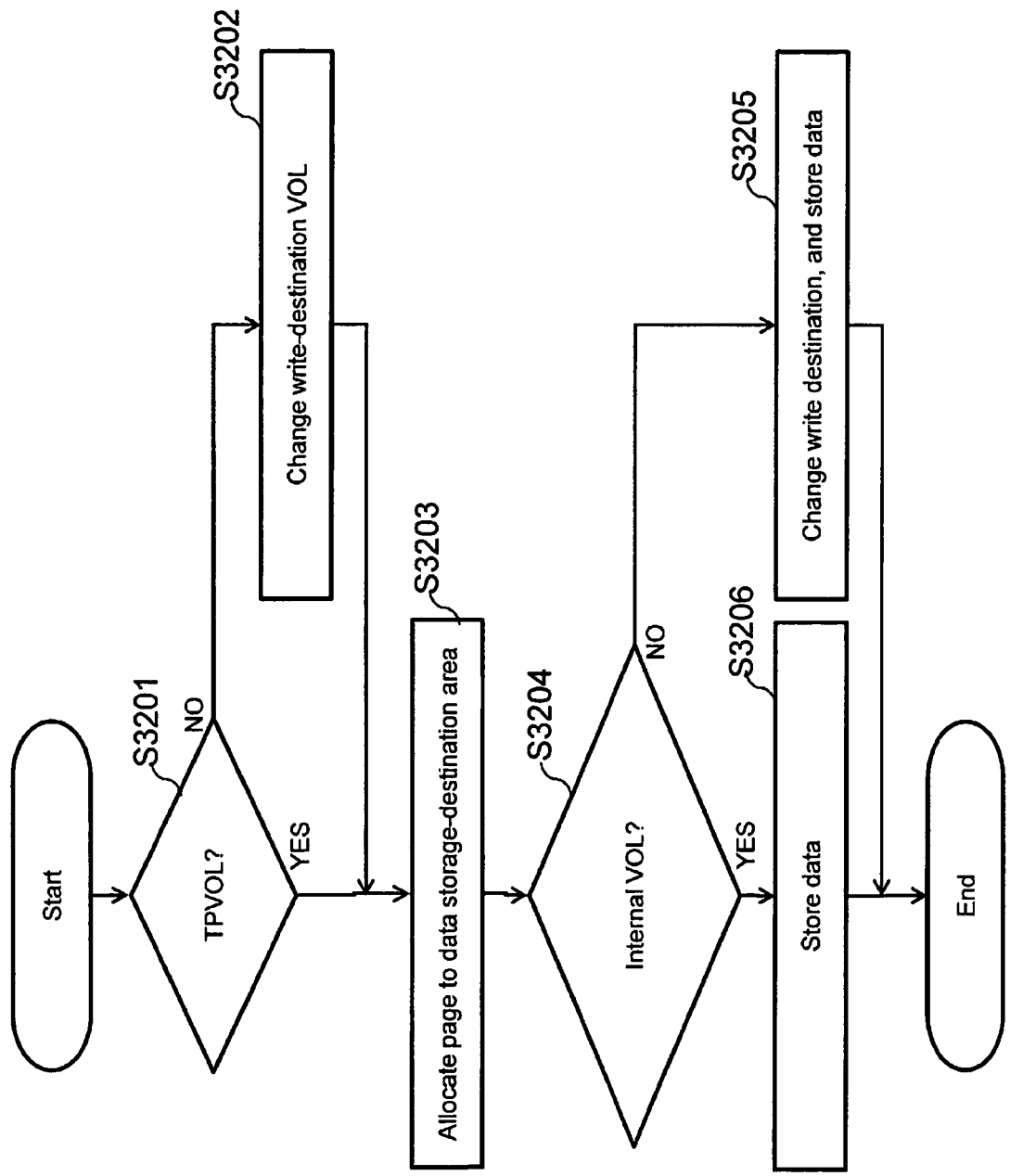
FIG. 32 is a flowchart of a data write process while converting from the target externally-coupled VOL to the TPVOL, and while migrating data from the target pool VOL (target externally-coupled VOL) to another pool VOL.

FIG. 32 is a flowchart of a data write process performed while converting from a target externally-couple VOL to a TPVOL, and while migrating data from a target pool VOL (target externally-coupled VOL) to another pool VOL.

In S3201, the I/O program 611 decides whether or not the write-destination VOL is a TPVOL. In a case where the result of the decision is affirmative, the I/O program 611 moves to S3203. In a case where the result of the decision is negative, the I/O program 611 moves to S3202.

In S3202, the program 611 changes the write-destination VOL from a normal VOL 201 to the TPVOL 220 subsequent to the conversion of this normal VOL 210.

In S3203, the program 611 allocates a real page to the write-destination virtual page. Furthermore, in a case where a real page has already been allocated to the write-destination virtual page, this S3203 may be skipped.

In S3204, the program 611 decides whether or not the real page 212 allocated to the write-destination virtual page is a real page in an internal VOL 210. In a case where the result of the decision is affirmative, the program 611 moves to S3206. In a case where the result of the decision is negative (that is, a case in which the real page allocated to the write-destination virtual page is a real page in an externally-coupled VOL), the program 611 moves to S3205.

In S3206, the program 611 stores data conforming to the write request in the real page 202 allocated to the write-destination virtual page.

In S3205, the program 611 allocates an allocatable real page inside the pool VOL serving as the internal VOL 210 to the write-destination virtual page in place of the real page 202 allocated to this virtual page, and stores the data conforming to the write request in this allocated real page.

According to this data write process, the storage system 100 need not suspend the receiving of a write request for a target device with which a target externally-coupled VOL is associated even during the conversion of the target externally-coupled VOL to a TPVOL, or during the migration of data from a target pool VOL (the target externally-coupled VOL) to another pool VOL.

Furthermore, the processing of S3201, S3202, and S3203 is not limited to this second case, and may also be performed with respect to the above-described first case (the case in which the target normal VOL is an internal VOL). That is, S3202 may be performed prior to the TPVOL being associated with the target device, which is associated with the target normal VOL, and S3202 need not be performed after the TPVOL has been associated with the target device, which is associated with the target normal VOL.

The preceding is an explanation of a case (the second case) in which the target normal VOL is an externally-coupled VOL. Furthermore, a rebalance process and a reallocation process may be performed regardless of whether the normal VOL is an internal VOL or an externally-coupled VOL.

Example 2

Example 2 will be explained below. In so doing, the explanation will focus on the points of difference with Example 1, and explanations of the points in common with Example 1 will be either simplified or omitted.

Figure 33:
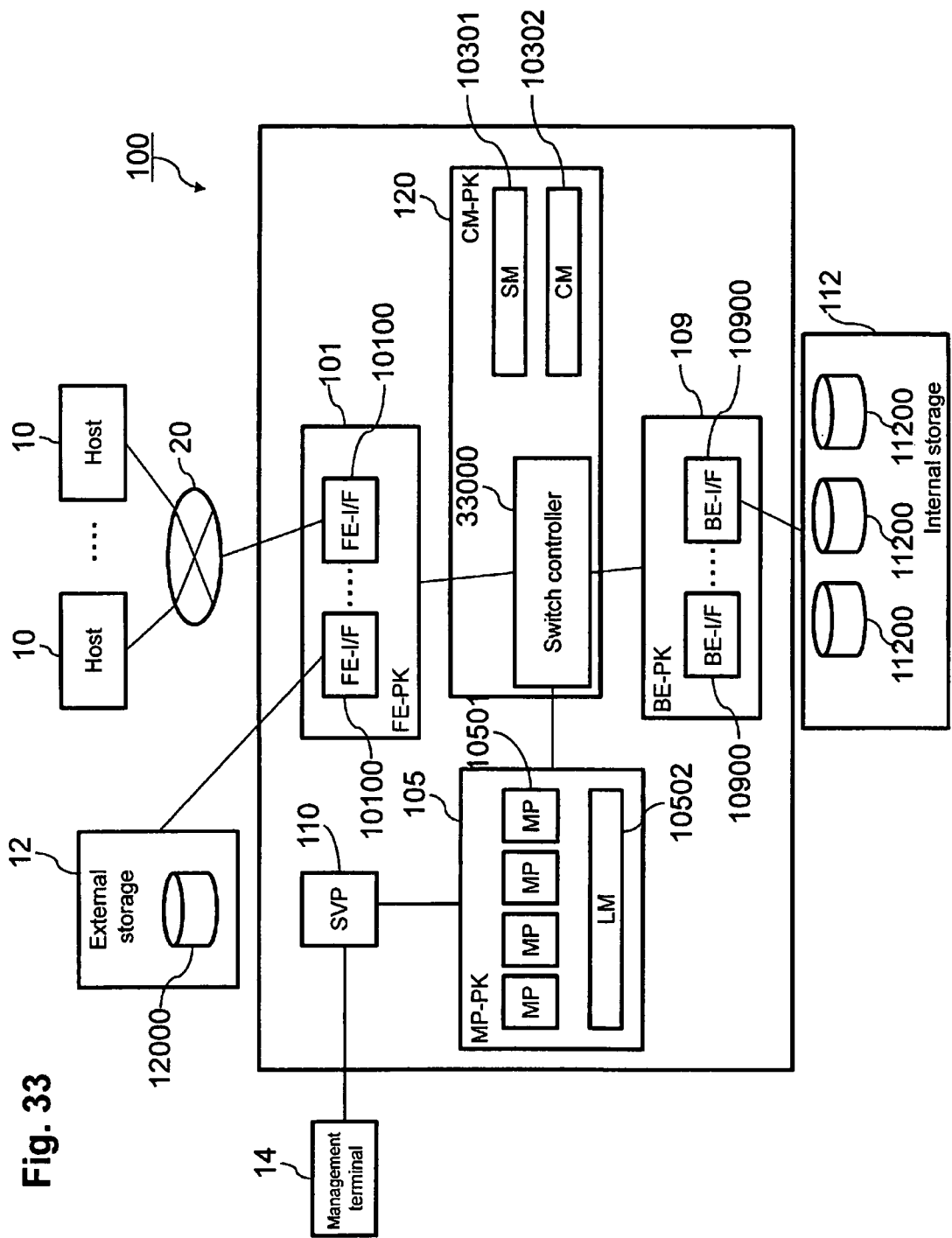
FIG. 33 shows the configuration of a storage system related to Example 2.

FIG. 33 shows the configuration of a storage system 200 related to Example 2.

The storage system 200 comprises a main module 120 in place of the SW-PK 107 and the CM-PK 103 elements inside the storage system 100.

The main module 120 comprises an SM 10301 and a CM 10302, and also comprises a switch controller 33000.

Multiple PKs, that is, a FE-PK 101, a BE-PK 109, and a MP-PK 105 are coupled to the switch controller 33000. The switch controller 33000 controls the connections between these PKs, and the connections between the PKs and either the SM or the CM.

Even a storage system 200 having the configuration described above achieves the same effects as the storage system 100 explained using Example 1.

The examples described hereinabove are examples for illustrating the present invention, and do not purport to limit the scope of the present invention solely to these examples. The present invention can be put into practice in a variety of other modes without departing from the gist thereof.

For example, the tier ranking of an internal VOL added anew to the storage system 100 (200) may be decided in accordance with the performance of the PDEV based on this internal VOL. Also, the tier ranking of an externally-coupled VOL newly added to the storage system 100 (200) may be the lowest level, may be decided on the basis of the performance of the PDEV based on the external VOL mapped to this externally-coupled VOL (and the status of the path to the external storage comprising this externally-coupled VOL), or may be configured by the user.

REFERENCE SIGNS LIST

10 Host
12 External storage
14 Management terminal
100 Storage system
112 Internal storage

The invention claimed is:

1. A storage system, which is coupled to a host computer, comprising:
   multiple first storage drives; and
   a controller configured to:
      provide multiple virtual volumes to the host computer;
      manage a storage pool including multiple physical pages which are partitioned storage areas of the first storage drives; and
      in response to a write request to a particular one of the virtual volumes, allocate a physical page of the multiple physical pages, which is not allocated to any virtual volume, to the particular one virtual volume, and store write data corresponding to the write request in the allocated physical page, wherein the controller is further configured to:

manage a first logical volume in which user data is stored;

incorporate multiple first physical storage pages, which are partitioned storage areas of the first logical volume, a into the storage pool;

create a first virtual volume;

allocate each of the multiple first physical pages to a virtual page, which has a same location in the first virtual volume as each corresponding one of the multiple first physical pages in the first logical volume, of the first virtual volume; and provide the host computer with the first logical volume.

2. A storage system according to claim 1, further comprising:

multiple second storage drives, wherein the controller is configured to manage multiple second physical pages, which are partitioned storage areas provided by the multiple second storage drives, as physical pages of the storage pool.

3. A storage system according to claim 1, further comprising:

multiple second storage drives, wherein the controller is configured to:

manage multiple second physical pages, which are partitioned storage areas provided by the multiple second storage drives, as physical pages of the storage pool; and migrate data stored in one of the multiple first physical pages allocated to the first virtual volume to one of the multiple second physical pages, and allocate the one of the multiple second physical pages, to which data is migrated, to the first virtual volume.

4. A storage system according to claim 3, wherein the multiple second storage drives feature higher performance than the first storage drives, and the controller is configured to:

monitor an access frequency with respect to each physical page allocated to the first virtual volume, from among the multiple first physical pages; and migrate data stored in a physical page with high access frequency of the physical pages allocated to the first virtual volume from among the multiple first physical pages, to at least one physical page of the multiple second physical pages, and allocate at least one physical page of the multiple second physical pages to the first virtual volume.

5. The storage system according to claim 1, wherein the first logical volume is created using storage area of the first storage drives.

6. The storage system according to claim 1, wherein the storage system is coupled to an external storage system comprising third storage drives, and wherein the first logical volume is created using storage area of the third storage drives.

7. The storage system according to claim 6, wherein the controller is configured to:

migrate data of the first virtual volume, stored in the third storage drives, to the first storage drives; and provide the first virtual volume, which is created using storage area of the first storage drives, to the host computer.

8. The storage system according to claim 1, wherein the same location is logical block address (LBA).

9. The storage system according to claim 1, wherein capacity of the first virtual volume is the same as capacity of the first logical volume.

10. A data management method in a storage system, which is coupled to a host computer, and which comprises multiple first storage drives and a controller, the data management method comprising the steps:

providing, by the controller, multiple virtual volumes to the host computer;

managing, by the controller, a storage pool including multiple physical pages which are partitioned storage areas of the first storage drives; and in response to a write request to a particular one of the virtual volumes, allocating, by the controller, a physical page of the multiple physical pages, which is not allocated to any virtual volume, to the virtual volume particular one, and store write data corresponding to the write request in the allocated physical page;

managing, by the controller, a first logical volume in which user data is stored;

incorporating, by the controller, multiple first physical storage pages, which are partitioned storage areas of the first logical volume, into the storage pool;

creating, by the controller, a first virtual volume;

allocating, by the controller, each of the multiple first physical pages to a virtual page, which has a same location in the first virtual volume as each corresponding one of the multiple first physical pages in the first logical volume, of the first virtual volume; and providing, by the controller, the host computer with the first logical volume.

11. The data management method according to claim 10, wherein the storage system is coupled to an external storage system comprising third storage drives, and wherein the first logical volume is created using storage area of the third storage drives.

12. The data management method according to claim 11, further comprising the steps of:

migrating, by the controller, data of the first virtual volume, stored in the third storage drives, to the first storage drives; and providing, by the controller, the first virtual volume, which is created using storage area of the first storage drives, to the host computer.

13. The data management method according to claim 10, wherein the same location is logical block address (LBA).

14. The data management method according to claim 10, wherein capacity of the first virtual volume is the same as capacity of the first logical volume.

* * * * *